(12) United States Patent
Goyal et al.

(10) Patent No.: US 10,142,370 B2
(45) Date of Patent: Nov. 27, 2018

(54) METHODS AND APPARATUS FOR GENERATING AND USING SECURITY ASSERTIONS ASSOCIATED WITH CONTAINERS IN A COMPUTING ENVIRONMENT

(71) Applicant: VMWARE, INC., Palo Alto, CA (US)

(72) Inventors: Pravin Goyal, Bangalore (IN); Gregory A. Frascadore, Palo Alto, CA (US)

(73) Assignee: VMWARE, INC, Palo Alto, CA (US)

(*) Notice: Subject to any disclaimer, the term of this patent is extended or adjusted under 35 U.S.C. 154(b) by 230 days.

(21) Appl. No.: 14/886,131

(22) Filed: Oct. 19, 2015

(65) Prior Publication Data
US 2016/0381075 A1  Dec. 29, 2016

(30) Foreign Application Priority Data
Jun. 29, 2015  (IN) .......................... 3317/CHE/2015

(51) Int. Cl.
*H04L 29/06* (2006.01)
*G06F 21/64* (2013.01)
(Continued)

(52) U.S. Cl.
CPC ............ *H04L 63/20* (2013.01); *G06F 21/577* (2013.01); *G06F 21/64* (2013.01); *G06F 2221/033* (2013.01); *H04L 9/3247* (2013.01)

(58) Field of Classification Search
CPC ......... H04L 63/20; H04L 9/32; H04L 9/3247; G06F 21/50; G06F 21/57; G06F 21/577; G06F 2221/033; G06F 21/64
See application file for complete search history.

(56) References Cited

U.S. PATENT DOCUMENTS

| | | | |
|---|---|---|---|
| 2005/0198628 A1* | 9/2005 | Graham .................... | G06F 8/63 717/174 |
| 2009/0249065 A1* | 10/2009 | De Atley ................ | G06F 21/51 713/164 |
| 2015/0378742 A1* | 12/2015 | Harrington ............... | G06F 9/44 719/318 |

OTHER PUBLICATIONS

Daniel Walsh, "Are Docker containers really secure?," retrieved from [https://opensource.com/business/14/7/docker-security-selinux], on Feb. 1, 2016, 10 pages.

(Continued)

*Primary Examiner* — Ayoub Alata
(74) *Attorney, Agent, or Firm* — Hanley, Flight & Zimmerman, LLC

(57) ABSTRACT

Methods and apparatus are disclosed to generate a security assertion document associated with a container image, and to use the security assertion document to determine whether a container image is suitable for use to assemble a corresponding container for execution in a host environment. In an example method, the generated security assertion document includes a security assertion resulting from an assessed policy rule. In the example method, the security assertion document is separate from the container image such that the generation of the security assertion document does not alter the container image itself. In an example method, the contents of the security assertion document may be analyzed and/or verified in relation to the associated container image in connection with determining whether or not to use the container image to assemble a corresponding container for execution in the example host environment.

63 Claims, 17 Drawing Sheets

(51) Int. Cl.
  *G06F 21/57* (2013.01)
  *H04L 9/32* (2006.01)

(56) References Cited

OTHER PUBLICATIONS

Joerg Fritsch, "Security Properties of Containers Managed by Docker," retrieved from [https://www.gartner.com/doc/2956826], on Jan. 7, 2015, 27 pages.
Jerome Petazzoni, "Containers & Docker: How Secure Are They?," retrieved from [http://blog.docker.com/2013/08/containers-docker-how-secure-are-they/], on Feb. 1, 2016, 14 pages.
Docker Inc., "Best practices for writing Dockerfiles," retrieved from [https://docs.docker.com/engine/articles/dockerfile_best-practices/], on Feb. 1, 2016, 17 pages.
Docker Inc., "Official Repositories on Docker Hub," retrieved from [https://docs.docker.com/docker-hub/official_repos/], on Feb. 1, 2016, 6 pages.
Michael Crosby, "Dockerfile Best Practices—take 2," retrieved from [http://crosbymichael.com/dockerfile-best-practices-take-2.html], on Feb. 1, 2016, 5 pages.
National Instiute of Standards and Technology, "National Checklist Program Repository," National Vulnerability Database, retrieved from [https://web.nvd.nist.gov/view/ncp/repository], on Feb. 2, 2016, 1 page.
The Mitre Corporation, "OVAL in the Enterprise," retrieved from [http://oval.mitre.org/], on Feb. 1, 2016, 2 pages.

\* cited by examiner

FIG. 5

| UNASSEMBLED PART | CONTAINER ASSESSABLE DESCRIPTION | |
|---|---|---|
| | SOURCE (Docker) | |
| 504 — Build file | Dockerfile | |
| 506 — Base image reference | Dockerfile or 'docker history <image>' | |
| 508 — Build arguments | Dockerfile or 'docker inspect <image>' | |
| 510 — Layer files | Dockerfile 'ADD' instructions or 'docker export <image>' | |
| 512 — Build environment values | Dockerfile or 'docker inspect <image>' | |

414 → 520

502 brackets 504–512

FIG. 6

| UNASSEMBLED PART | CONTAINER ASSESSABLE DESCRIPTION | |
|---|---|---|
| | SOURCE (Docker) | |
| 504 — Build file | Dockerfile | |
| 506 — Base image reference | Dockerfile or 'docker history <image>' | |
| 508 — Build arguments | Dockerfile or 'docker inspect <image>' | |
| 510 — Layer files | Dockerfile 'ADD' instructions or 'docker export <image>' | |
| 512 — Build environment values | Dockerfile or 'docker inspect <image>' | |
| 606 — Creation arguments | 'docker inspect <image>' | |
| 608 — Run arguments | '/var/lib/docker/containers/*/(*.json, hosts, *.conf)' | |
| 610 — Host environment | Host system characteristics | |

414 → 520

604 brackets 504–512; 612 brackets 606–610; 602 brackets all

ASSESSMENT POLICY — 120

```
<definition id="oval:com.vmware.docker:def:5" class="compliance" version="1">
  <metadata>
    <title>Non-Root Service User is Defined</title>
    <description>to avoid privilege escalation, a user other than 'root' should be defined within the container.</description>
  </metadata>
  <criteria negate="false" operator="AND">
    <extend_definition comment="Docker_Installed"
      definition_ref="oval:com.vmware.docker:def:1" negate="false"/>
    <criteria negate="false" operator="AND">
      <criterion comment="Service_User_Defined" test_ref="oval:com.vmware.docker:tst:7"/>
      <criterion comment="Service_User_is_not_'root'"
        test_ref="oval:com.vmware.docker:tst:6"/>
    </criteria>
  </criteria>
</definition>
```

METHODS AND APPARATUS FOR GENERATING AND USING SECURITY ASSERTIONS ASSOCIATED WITH CONTAINERS IN A COMPUTING ENVIRONMENT

RELATED APPLICATIONS

Benefit is claimed under 35 U.S.C. 119(a)-(d) to Foreign application Serial No. 3317/CHE/2015 filed in India entitled "METHODS AND APPARATUS FOR GENERATING AND USING SECURITY ASSERTIONS ASSOCIATED WITH CONTAINERS IN A COMPUTING ENVIRONMENT", on Jun. 29, 2015, by VMware, Inc., which is herein incorporated in its entirety by reference for all purposes.

FIELD OF THE DISCLOSURE

This disclosure relates generally to virtual computing environments, and, more particularly, to methods and apparatus for generating and using security assertions associated with containers in a computing environment.

BACKGROUND

In computing environments, a container is a virtual structure used to run an isolated instance of an application in a host environment. A container virtualizes at the operating system level by abstracting (e.g., isolating) an application from the operating system. For example, an application executing in a container is isolated from an application executing on the host operating system or in other containers.

BRIEF DESCRIPTION OF THE DRAWINGS

FIG. 5 is an example container assessable description that may be created and/or assembled by the example container assessable description assembler of FIG. 4.

FIG. 6 is another example container assessable description that may be created and/or assembled by the example container assessable description assembler of FIG. 4.

FIG. 7 illustrates example assessment policy rules that may be used by the example assessment engine of FIG. 4.

The figures are not to scale. Wherever possible, the same reference numbers will be used throughout the drawing(s) and accompanying written description to refer to the same or like parts.

DETAILED DESCRIPTION

Figure 1:
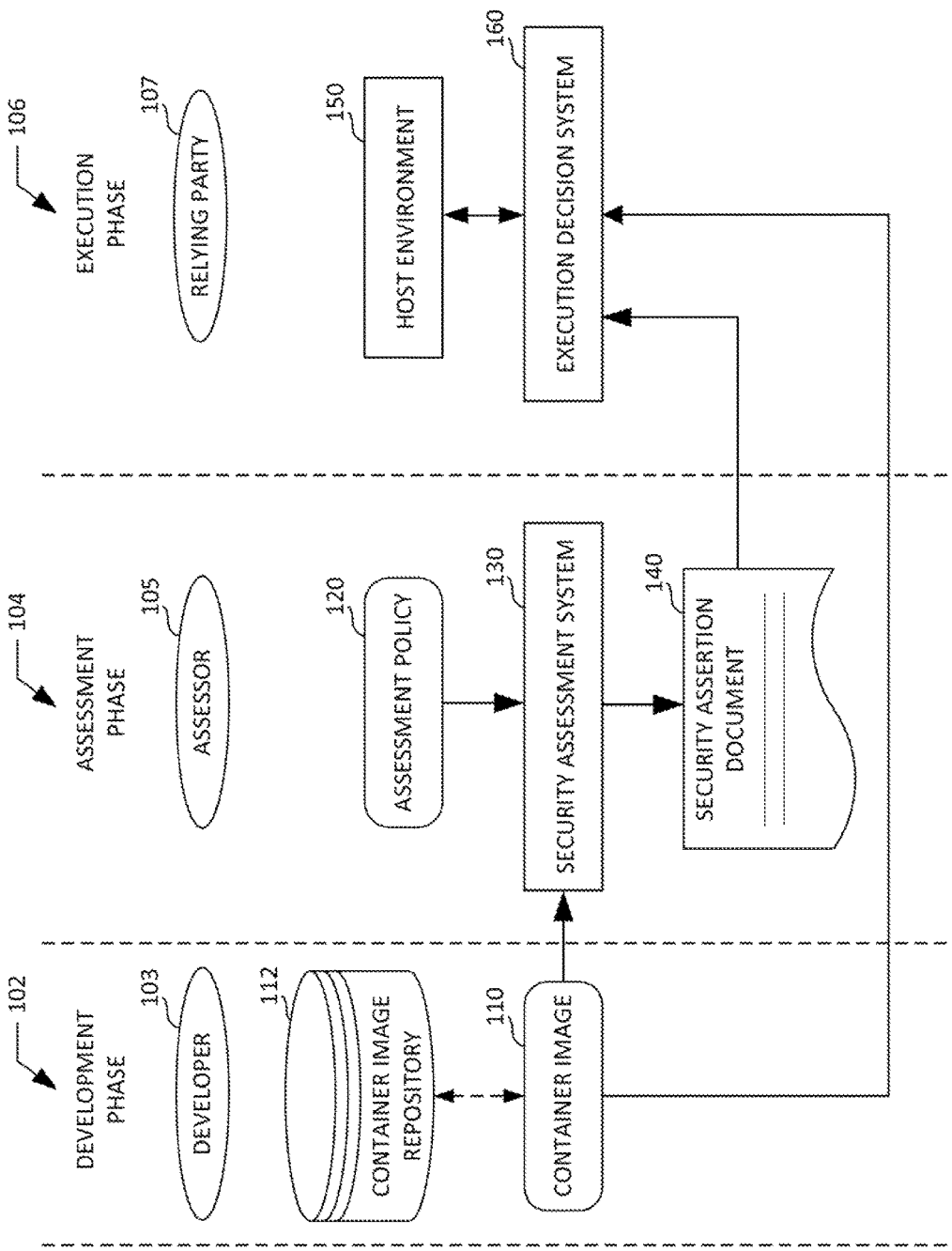
FIG. 1 is a an example security assessment system and an example execution decision system that may be used to generate and use security assertions associated with containers in accordance with the teachings of this disclosure.

Containers are often used in computing environments to run applications, programs, utilities, and/or any other software in isolation. Containers are often used to achieve improved resource management (e.g., resources used by containerized components are isolated for use only by those components that are part of the same container) and/or for security purposes (e.g., restricting access to containerized files or components). In addition, containers may also be used to achieve lightweight, reproducible application deployment. While a container is intended to run as a well-isolated instance of software in a host environment, the security properties of a container image and/or a container can impact operations of other resources and/or processes in a host computer environment in which the container executes.

Prior to running as a container in the host environment, the container is defined in a container image that specifies components such as, for example, an application along with any libraries, binaries and/or other files needed to execute the container in the host environment. In some examples, the specified components remain unassembled (e.g., they are not located together to form a container) until a time at which the container is to be executed. When a determination is made to execute the container in the host environment, the host environment uses the container image to assemble the previously unassembled parts specified in the container image for execution as a container.

Prior security controls of a container image and/or a container are reconfigurable, and the reconfigurable nature of these security controls potentially exposes a container image and/or a container to security risks such as misconfigurations and/or insertions of malware that could adversely affect the host environment and/or other environments or data accessed by the container during execution. As a result of such security risk exposure, there is often no reliable assurance as to whether components and configurations specified a container image for a container are safe or suitable for the host environment in which the container will execute.

In certain instances, a host environment may desire assurances regarding the security of a container image and/or a container. For example, in a platform as a service (PaaS) environment, the PaaS may already host several containers and virtual applications (vApps). Without security assurances, the PaaS cannot confirm that any arriving containerized application will not be a threat that provides attackers control over aspects of the platform. Providing such assurances, however, is difficult using prior techniques because container images and/or containers are typically developed across numerous development stages by different developers, and are retrieved from public container image repositories such as a Docker Hub® image repository. Prior techniques do not provide a reliable way for the PaaS, or any other host environment, to determine if a container image and/or a container is securely configured, or is likely to create a vulnerability for the host environment. Without an assurance that a container will not introduce undesired conditions, a significant amount of risk is assumed when host environments deploy container images and/or containers using prior techniques.

Examples disclosed herein can be used to generate security assertion documents associated with container images and can be used to determine whether a container image can be safely used to assemble and execute a corresponding container in a host environment. For example, a security assertion document can be generated for a container image by analyzing the container image relative to one or more policy rules. An assessment of the container image against a policy rule generates a security assertion about the container image asserting that the container image satisfies the one or more policy rules. In some examples, a security assertion document includes both security assertions resulting from previously assessed policy rules, as well as security obligations associated with yet to be assessed policy rules. For example, a security obligation may specify that all components to be assembled in a container at a time of execution must be mapped to network ports that are not privileged at the time of execution. In some examples, a security assertion document is separate from a corresponding container image such that the generation of the security assertion document does not alter the form, structure, contents or properties of the container image itself. In such cases, because the security assertion document is kept separate from the container image, examples disclosed herein can be advantageously used in connection with existing container management technologies such as Docker®, Rocket™, Linux® containers (LXC) and others. In some examples, the security assertions and/or security obligations of the security assertion document may be verified relative to a corresponding container image in conjunction with determining whether to execute a corresponding container in a host environment.

FIG. 1 illustrates an example development phase 102, an example assessment phase 104, and an example execution phase 106. During the example development phase 102, a developer 103 develops an example container image 110 or a portion thereof. A container image is a scheme and/or blueprint for a container that will subsequently be assembled. The developer 103 may obtain the example container image 110 from, and/or publish the example container image 110 for storage in, an example container image repository 112. In the illustrated example, the security assessment system 130 may be used during the example assessment phase 104 to assess the security of the example container image 110 and to generate an example security assertion document 140 associated with the example container image 110. In the illustrated example of FIG. 1, an example execution decision system 160 may be used during the execution phase 106 to determine whether the example container image 110 is suitable for use to create and/or assemble a corresponding container for execution in an example host environment 150. For example, the execution decision system 160 may make such a determination based on the example security assertion document 140 generated by the example security assessment system 130. In the illustrated example, the security assertion document 140 asserts that components or parts specified by the example container image 110 satisfy one or more policy rules contained in an example assessment policy 120.

In the illustrated example of FIG. 1, the example developer 103, the example assessor 105 and the example relying party 107 are shown in corresponding ones of the phases 102, 104, 106. Although the illustrated example shows the developer 103, the assessor 105 and the relying party 107 as constituting separate entities, alternative relationships among these entities may also exist. For example, the relying party 107 may alternatively be the same entity as the assessor 105, or the relying party 107 may alternatively be the same entity as the developer 103. In the illustrated example, the assessor 105 is independent from the developer 103, such that the assessor 105 is not biased and/or otherwise influenced by any interest which the developer 103 may have in the container image 110 being assessed in a favorable manner by the security assessment system 130. However, in other examples, the assessor 105 may alternatively be the same entity as the developer 103.

In the illustrated example of FIG. 1, the example developer 103 develops and/or builds the example container image 110. As described in greater detail below in connection with FIG. 2, the container image 110 specifies a plurality of components or parts such as an example executable program (e.g., an application) along with example libraries, example binaries, and/or any other example files upon which the executable program depends in order to execute in an example host environment 150. Prior to a corresponding container being executed as a container in the example host environment 150, the plurality of components or parts specified by the container image 110 are unassembled. That is, the plurality of unassembled components or parts exist separately but are not yet co-located in a container for execution. As described in greater detail below in connection with FIGS. 3, 4, 5, 6, 9 and 10, the unassembled parts of the container image 110 are assembled in the example host environment 150 when the execution decision system 160 has determined to execute the container image 110 as a container in the host environment 150.

In the illustrated example of FIG. 1, the example security assessment system 130 generates the security assertion document 140. The example security assessment system 130, including any components and/or subsystems thereof, may be implemented using either a single computing system or multiple computing systems, and may be implemented using either a centralized computer architecture or a distributed computer architecture. The example security assessment system 130 can be implemented using, for example, one or more of a server, a personal computer, or any other type of computing device.

In the illustrated example, the example security assessment system 130 obtains and/or receives the example container image 110 as input from any source that maintains and/or stores the container image 110, regardless of whether the source is controlled, maintained and/or otherwise operated by the developer 103. For example, the security assessment system 130 may obtain and/or receive the container image 110 from the example container image repository 112 to which the developer 103 has published and/or stored the container image 110. The example container image repository 112 may be implemented using either a centralized computer architecture or a distributed computer architecture. The example container image repository 112 is described in greater detail blow in connection with FIG. 2.

In the illustrated example, the security assessment system 130 analyzes the example container image 110 relative to an example assessment policy 120 to generate the example security assertion document 140. As described in greater detail below, although the example security assertion document 140 corresponds to the example container image 110, the security assertion document 140 is separate from the container image 110.

In the illustrated example of FIG. 1, the example relying party 107 uses the example execution decision system 160 and the example host environment 150. The example execution decision system 160, including any components and/or subsystems thereof, may be implemented using either a single computing system or multiple computing systems, and may be implemented using either a centralized computer architecture or a distributed computer architecture. The example execution decision system 160 can be implemented using, for example, one or more of a server, a personal computer, or any other type of computing device.

In the illustrated example, the execution decision system 160 obtains and/or receives the example security assertion document 140 and the example container image 110 to determine whether to use the container image 110 to assemble a corresponding container for execution in the host environment 150. Example operations that the execution decision system 160 performs in conjunction with determining whether to use the example container image 110 to execute a corresponding container in the example host environment 150 are described in detail below in connection with FIG. 10. Although the execution decision system 160 is shown in the illustrated example of FIG. 1 as obtaining and/or receiving the security assertion document 140 directly from the security assessment system 130, the execution decision system 160 may alternatively obtain and/or receive the security assertion document 140 from any other source that maintains and/or stores the security assertion document 140, regardless of whether the source is controlled, maintained and/or otherwise operated by the assessor 105. In addition, the execution decision system 160 may obtain and/or receive the container image 110 from any source that maintains and/or stores the container image 110, regardless of whether the source is controlled, maintained and/or otherwise operated by the developer 103. For example, the execution decision system 160 may obtain and/or receive the container image 110 from the example container image repository 112 to which the developer 103 has published and/or stored the container image 110.

Figure 2:
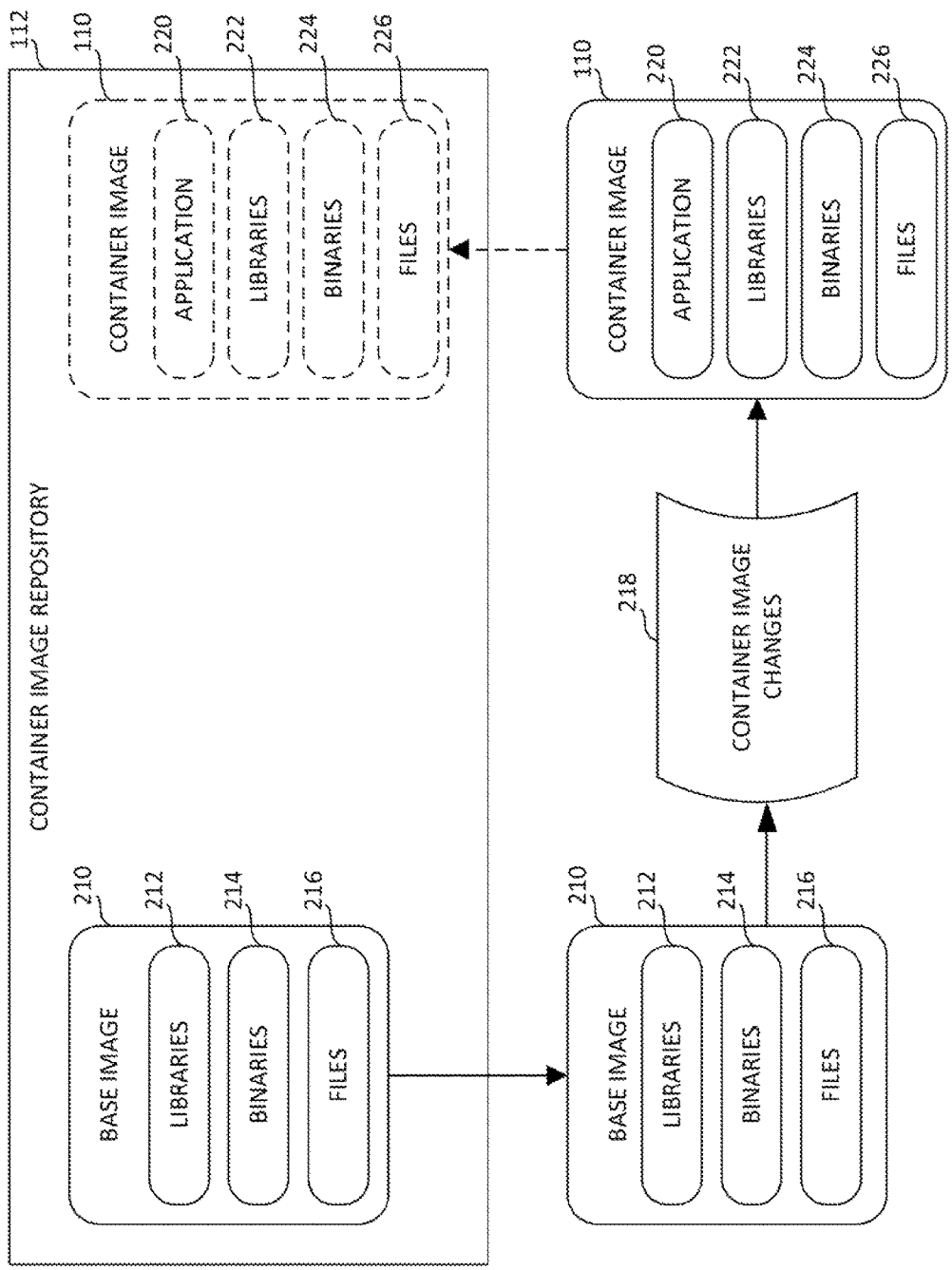
FIG. 2 is an example container image repository from which an example container image may be obtained and/or to which an example container image may be stored and/or published.

FIG. 2 shows the example container image repository 112 of FIG. 1 in which the example container image 110 may be stored and/or published. The example container image repository 112 serves as a storage facility for container images, such as the example container image 110, and base images, such as an example base image 210. As used herein, "base" is a relative term. For example, a base image is a base relative to another container image that is built upon it. The base image, however, could itself be a container image that can be used to execute a corresponding container. In some examples, the base image may be developed based on another container image serving as a base for the base image. In the illustrated example of FIG. 2, the base image 210 serves as an initial framework for the development of another container image, such as the example container image 110. For example, the developer 103 of FIG. 1 may access the example base image 210 from the container image repository 112 if the developer 103 elects to use the base image 210 as a starting point for developing another container image. The example base image 210 specifies example libraries 212, example binaries 214 and example files 216 that the developer 103 may use and/or modify by, for example, adding one or more executable programs and/or layers of additional libraries, binaries and/or files.

In the illustrated example, the developer 103 modifies and/or adds to the base image 210 (e.g., by applying container image changes 218 to the base image 210) to build the example container image 110. The container image 110 of the illustrated example specifies an example application 220, example libraries 222, example binaries 224, and example files 226. For example, the libraries 222, the binaries 224, and the files 226 are used by the example application 220 during an execution phase (e.g., the execution phase 106). After the example container image 110 has been built, the developer 103 may store and/or publish the container image 110 to the example container image repository 112 as shown in FIG. 2. The example container image repository 112 of FIGS. 1 and 2 may contain any number of container images and/or base images, including without limitation a single container image. In some examples, the example container image 110 stored in the example container image repository 112 is available to any number of developers who may access the container image 110 from the container image repository 112. In this regard, the example container image 110 is mobile code that can be built upon and/or otherwise modified by any developer and/or other entity having access to the example container image 110.

While in the example of FIG. 1 the security assessment system 130 generates the example security assertion document 140 based on the example container image 110, the security assessment system 130 may likewise generate a separate security assertion document based on the example base image 210. In some examples, the security assertion document 140 based on the example container image 110 may depend on the assertions in the separate security assertion document based on the example base image 210. Thus, a separate security assertion document may exist for any container image and/or base image that is processed by the example security assessment system 130. In some examples, the security assessment system 130 generates a separate security assertion document for each iteration of a container image (e.g., a base image and any intermediate container images from which a final container image was developed). Accordingly, any reference and/or description set forth herein with regard to the example security assessment system 130 generating a security assertion document associated with a container image should be understood to be a security assertion document for any type of container image including base images, intermediate container images, and/or final container images. As discussed above, a base image is an initial framework specifying basic components that a developer may use to develop other container images. In examples disclosed herein, an intermediate container image is an intermediate framework specifying components that have been built upon and/or otherwise modified in relation to the components of a base image. The components of an intermediate container image differ in some respect from those of a final container image. Thus, an intermediate container image is a base relative to a final container image. In examples disclosed herein, a final container image specifies the components that have been built upon and/or otherwise modified in relation to the components of a base image and any intermediate container images from which the final container image was developed. The components of a final container image are to be used to execute a corresponding container in a host environment (e.g., the example host environment 150 of FIG. 1).

In examples where the security assessment system 130 generates separate security assertion documents for each iteration of a container image (e.g., a base image and any intermediate container images from which the container image was developed), the separate security assertion documents may be used to determine the point in the chain of development of the container image at which malicious and/or otherwise non-compliant code was introduced. For example, a security assertion document associated with a base image and a separate security assertion document associated with an intermediate container image may both assert that the components of the respective images are compliant with the rules of a particular policy. A separate security assertion document associated with the final container image, however, might indicate that the components of the final container image are non-compliant with the rules of that same policy. In such an example, the source of non-compliance is tied to the modifications that a developer made relative to the intermediate container image in the course of building the final container image.

Figure 3:
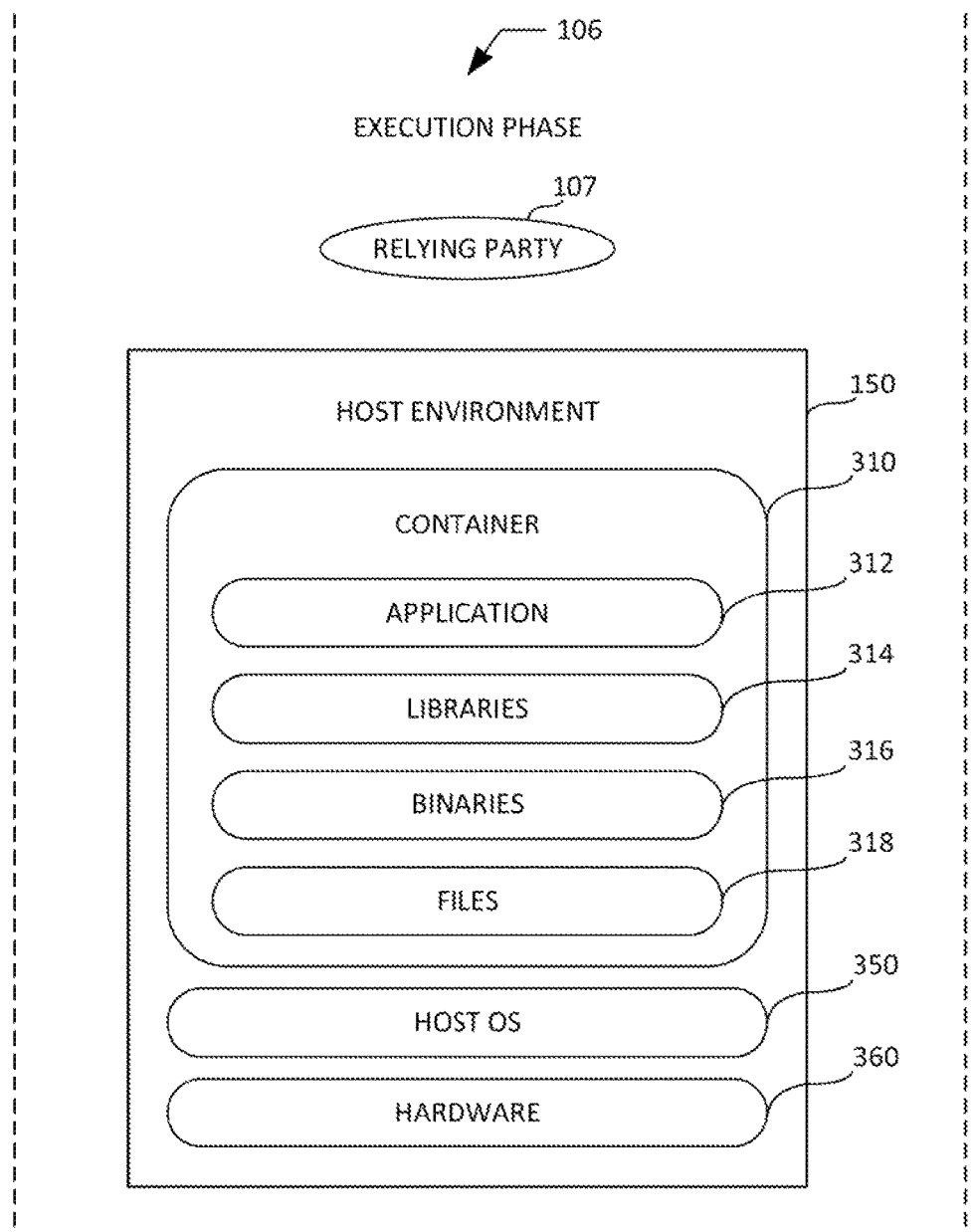
FIG. 3 is an example container running in the example host environment of FIG. 1.

FIG. 3 is an example container 310 running in the example host environment 150 during the example execution phase 106 of FIG. 1. The example host environment 150 can be implemented using, for example, a server, a personal computer, a mobile phone (e.g., a cell phone, a smart phone), a tablet computer, or any other type of computing device. The example host environment 150 includes an example host operating system (OS) 350 and example hardware 360 associated with the host environment 150. The example host OS 350 may be Linux®, Microsoft Windows® or Apple OS X®. In the illustrated example, the hardware 360 includes the example processing platform 1600 of FIG. 16.

In the illustrated example, when the execution decision system 160 (FIG. 1) receives a request to execute a container in the host environment 150 based on the container image 110, the execution decision system 160 generates the example container 310 by assembling the previously unassembled parts specified in the example container image 110 of FIGS. 1 and 2. After generating the container 310, the example execution decision system 160 determines whether the container 310 meets the policy requirements required for execution based on the corresponding security assertion document 140 (FIG. 1). For example, meeting the policy requirements may be used as an indicator of whether it is safe to execute the container 310. Alternatively, the example execution decision system 160 determines whether the container 310 meets the policy requirements required for execution based on the corresponding security assertion document 140 prior to assembling the previously unassembled parts specified in the example container image 110. The operations that the example execution decision system 160 performs in conjunction with determining whether it is safe to execute the example container image 110 as a container 310 in the example host environment 150 are described in greater detail below in connection with FIG. 10.

Figure 4:
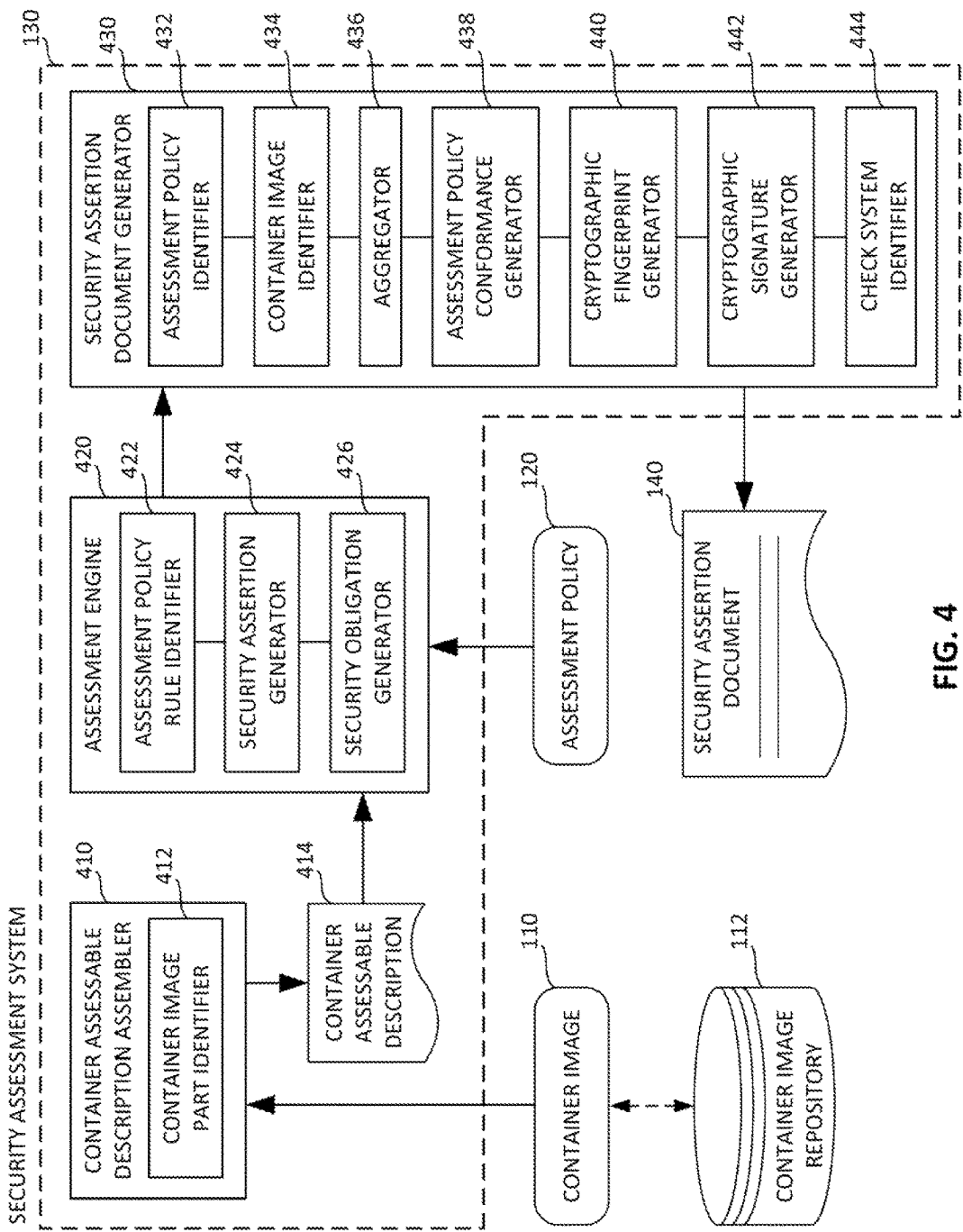
FIG. 4 shows additional detail of the example security assessment system of FIG. 1.

FIG. 4 illustrates the example security assessment system 130 of FIG. 1. The example security assessment system 130 may be used to assess the security of the example container image 110 (FIGS. 1 and 2) and to generate the example security assertion document 140 (FIG. 1) associated with the example container image 110. The example security assessment system 130, including any components and/or subsystems thereof, may be implemented using either a single computing system or multiple computing systems, and may be implemented using either a centralized computer architecture or a distributed computer architecture.

In the illustrated example, the security assessment system 130 includes an example container assessable description assembler 410 that includes an example container image part identifier 412. The security assessment system 130 also includes an example assessment engine 420 that includes an example assessment policy rule identifier 422, an example security assertion generator 424 and an example security obligation generator 426. The security assessment system 130 also includes an example security assertion document generator 430 that includes an example assessment policy identifier 432, an example container image identifier 434, an example aggregator 436, an example assessment policy conformance generator 438, an example cryptographic fingerprint generator 440, an example cryptographic signature generator 442 and an example check system identifier 444. However, fewer or additional structures may be implemented to carry out one or more portions of the functionalities implemented by the example container assessable description assembler 410, the example container image part identifier 412, the example assessment engine 420, the example assessment policy rule identifier 422, the example security assertion generator 424, the example security obligation generator 426, the example security assertion document generator 430, the example assessment policy identifier 432, the example container image identifier 434, the example aggregator 436, the example assessment policy conformance generator 438, the example cryptographic fingerprint generator 440, the example cryptographic signature generator 442, the example check system identifier 444, and/or other structures associated with one or more additional and/or alternative functions disclosed herein in connection with the security assessment system 130.

In the illustrated example of FIG. 4, the example container assessable description assembler 410 obtains and/or receives the example container image 110 from the container image repository 112 of FIGS. 1 and 2 or from any other suitable source. While FIG. 4 illustrates the example container image 110 and the example container image repository 112 as being located separately from the example security assessment system 130, the container image 110 and/or the container image repository 112 may alternatively be located locally within the example security assessment system 130 and/or locally within the example container assessable description assembler 410.

In the illustrated example of FIG. 4, the example container image part identifier 412 of the container assessable description assembler 410 identifies one or more unassembled parts specified by the example container image 110. As used herein, "unassembled part" refers to any one of the pieces, components, parameters, sections and/or elements that make up, form and/or are referenced by a container image. For example, the container image 110 specifies one or more parts that are to be assembled to form a container for execution during the execution phase 106 of FIG. 1. An "unassembled part" refers to a part that is not yet combined or assembled with other parts to make a container. For example, since a container image is a plan or scheme for assembling parts to form a container, parts specified in the container image may remain as "unassembled parts" until the execution phase 106. The unassembled parts specified in the container image 110 may include, for example, a build file, a base image reference, a build argument, a layer file, a build environment value, a creation argument, a run argument, or a host environment value. As used herein, "build file" refers to any file containing instructions that direct how a container system (e.g., Docker®) builds and/or constructs an image (e.g., the example container image 110). As used herein, "base image reference" refers to a reference in a build file to the next image in the stack of images that will ultimately be assembled into a container by a run command. As used herein, "build argument" refers to any argument (e.g., a command line argument) applied by and/or to the container system as it builds and/or constructs an image. As used herein "layer file" refers to any of the contents of files and directories included in an image during image building. As used herein, "build environment value" refers to any parameters (e.g., UNIX® environment values) to the container system as it builds and/or constructs an image. As used herein "run argument" refers to any argument that directs the container system how to assemble and execute a container and identifies the resources to which the container will have access. As used herein, "creation argument" refers to a run argument that assembles a container but does not execute the assembled container. As used herein, "host environment value" refers to any parameters that the container system obtains from the host environment (e.g., the example host environment 150).

After the example container image part identifier 412 has identified the unassembled parts specified in the example container image 110, the example container assessable description assembler 410 creates and/or assembles an example container assessable description 414 associated with the example container image 110. An example container assessable description 414 created and/or assembled by the example container assessable description assembler 410 is illustrated in FIG. 5. Referring to FIG. 5, the example container assessable description 414 includes an identification of the unassembled parts 502 that are specified in the example container image 110 and identified by the example container image part identifier 412. In the illustrated example of FIG. 5, the unassembled parts 502 include an example build file 504, an example base image reference 506, example build arguments 508, example layer files 510 and example build environment values 512. While the example container assessable description 414 includes a specific number and type of unassembled parts 502, the example container assessable description 414 may contain any number and/or any type of unassembled parts 502. In the illustrated example, the example container assessable description 414 includes a source identification 520 that identifies a source of each unassembled part 502. With respect to the unassembled parts 502 associated with the container image 110, the source identification 520 for the example build file 504 is "Dockerfile," the source identification 520 for the example base image reference 506 is "Dockerfile or 'docker history <image>,'" the source identification 520 for the example build arguments 508 is "Dockerfile or 'docker inspect <image>,'" the source identification 520 for the example layer files 510 is "Dockerfile 'ADD' instructions or 'docker export <images>,'" and the source identification 520 for the example build environment values 512 is "Dockerfile or 'docker inspect <image>.'"

An alternate example container assessable description 414 that may be created and/or assembled by the example container assessable description assembler 410 of FIG. 4 is illustrated in FIG. 6. In the illustrated example of FIG. 6, the container assessable description 414 includes an identification of the unassembled parts 602 identified or detected by the example container image part identifier 412 as being specified in the example container image 110. The example container assessable description 414 of FIG. 6 is similar to the example container assessable description 414 of FIG. 5 described above in that both contain the unassembled parts including the example build file 504, the example base image reference 506, example build arguments 508, example layer files 510 and example build environment values 512. The example container assessable description 414 of FIG. 6 differs from the example container assessable description 414 of FIG. 5 described above in that the container assessable description 414 of FIG. 6 includes additional unassembled parts including creation arguments 606, run arguments 608 and host environment values 610. With respect to the unassembled parts 602 of FIG. 6 associated with the container image 110, the source identification 520 for the example creation arguments 606 is "'docker inspect <image>,'" the source identification 520 for the example run arguments 608 is "'/var/lib/docker/containers/*/{*.json, hosts, *.conf}'" and the source identification 520 for the example host environment values 610 is "host system characteristics."

In the illustrated example of FIG. 6, unlike the build file 504, the base image reference 506, the build arguments 508, the layer files 510 and the build environment values 512, which are available to the container assessable description assembler 410 from the example container image 110 before the execution phase 106 (FIG. 1), the creation arguments 606, run arguments 608 and host environment values 610 are unavailable to the container assessable description assembler 410 before the execution phase 106 because the security assessment system 130, which operates in the assessment phase 104 (FIG. 1), is unaware of the runtime characteristics associated with executing a container in the host environment 150 (e.g., the example container 310 executing in the example host environment 150 as shown in FIG. 3). Accordingly, the example container image part identifier 412 of the container assessable description assembler 410 further identifies the example unassembled parts 602 as example pre-execution phase parts 604 and example execution phase parts 612. As used herein, "pre-execution phase part" refers to an unassembled part of a container image (e.g., the container image 110) having one or more properties and/or characteristics that is/are assessable relative to one or more rules of the assessment policy 120 outside of a host environment (e.g., the host environment 150) in which the container image is assembled for execution as a container. As used herein, "execution phase part" refers to an unassembled part of a container image (e.g., the container image 110) having one or more properties and/or characteristics that is/are not assessable relative to one or more rules of the assessment policy 120 outside of a host environment (e.g., the host environment 150) in which the container image is assembled for execution as a container. While the illustrated example of FIG. 6 shows a container assessable description 414 having a specific number of pre-execution phase parts 604 and a specific number of execution phase parts 612, the container assessable description 414 may contain any number of pre-execution phase parts 604 or execution phase parts 612. As described in greater detail below, the execution phase parts 612 identified by the example container assessable description assembler 410 will be available to the example execution decision system 160 that determines whether to use the example container image 110 to create and execute the container 310 in the host environment 150.

The example container assessable descriptions 414 of FIGS. 5 and 6 respectively provide one or more properties that are capable of being tested against the policy rules of an example assessment policy 120. As used herein, the term "property" refers to an attribute, quality and/or characteristic of a machine-readable object, member and/or data structure. Each property has associated information that may or may not be available to the example assessment engine 420 of the example security assessment system 130 for testing before the execution phase 106. Properties for which information is not available to the example assessment engine 420 before the execution phase 106 for testing will typically become available to the example execution decision system 160 during the execution phase 106 when the particular example host environment 150 is known.

For example, a pre-execution phase part 604 such as a build file 504 may contain a "USER" property having a value of "USER_A." Because the build file 504 constitutes a pre-execution phase part 604 of the container assessable description 414, the "USER" property constitutes a pre-execution phase property that can be tested against a policy rule associated with the "USER" property. As used herein, "pre-execution phase property" refers to a property of a pre-execution phase part of a container image (e.g., the container image 110) that is assessable relative to one or more rules of the assessment policy 120 outside of a host environment (e.g., the host environment 150) in which the container image is assembled for execution as a container. In some examples, the policy rule may specify an expected value for the property being tested. For example, a policy rule associated with the "USER" property may specify an expected value of "USER_B" with the "USER" property. In such an example, the "USER" property of the container assessable description 414 will fail to satisfy the policy rule, because the tested "USER" property of the container assessable description 414 has an assessed value ("USER_A") that does not match the expected value ("USER_B") for the "USER" property specified by the policy rule. As used herein, "expected value" refers to the value of a property specified by a policy rule. In this regard, the expected value of a property is entirely independent of the assessed value of a property, as the assessed value is tied to a specific container assessable description 414. As used herein, "assessed value" refers to the value of a property associated with an unassembled part of the example container assessable description 414. For example, assessed values may be determined by the example security assessment system 130 during the assessment phase 104 for pre-execution phase properties to compare against expected values specified in policy rules. Additionally or alternatively, the example execution decision system 160 determines assessed values for execution phase properties during the execution phase 106 to compare against expected values specified in policy rules.

As described above, properties which are not available to the example assessment engine 420 for testing before the execution phase 106 will typically become available to the example execution decision system 160 when the particular example host environment 150 is known. In the illustrated example, the example host environment 150 is the runtime environment in which the example container 310 will execute. For example, an execution phase part 612 such as the example run argument 608 may specify an "EXPOSED_PORTS" property. In such example, the value of the "EXPOSED_PORTS" property is unknown to the example assessment engine 420 before the execution phase 106 because the host environment 150 is not yet known. At such time, the assessment engine 420 is not associated with the example host environment 150 and, thus, cannot obtain the value of the "EXPOSED_PORTS" property of the example host environment 150. Because the run argument 608 constitutes an execution phase part 612 of the example container assessable description 414, the "EXPOSED_PORTS" property constitutes an execution phase property that only becomes available for testing by the example execution decision system 160. As used herein, "execution phase property" refers to a property of an execution phase part of a container image (e.g., the container image 110) that is not assessable relative to one or more rules of the assessment policy 120 outside of a host environment (e.g., the host environment 150) in which the container image is assembled for execution as a container. As such, in the context of the example host environment 150 during the execution phase 106, the execution phase parts 612 and the execution phase properties of the container assessable description 414 become available for testing against the policy rules. For example, the execution decision system 160 and/or the example host environment 150 during the execution phase 106 analyzes the port mappings of the host environment 150 to identify that "80, 443" is the assessed value of the "EXPOSED_PORTS" property for the host environment 150. The "EXPOSED_PORTS" property and its assessed value of "80, 443" can then be tested by the example execution decision system 160 against a policy rule associated with the "EXPOSED_PORTS" property. In some examples, the policy rule may contain an expected value for the property being tested. For example, a policy rule associated with the "EXPOSED_PORTS" property may associate an expected value of "NONE" with the "EXPOSED_PORTS" property. In such an example, the "EXPOSED_PORTS" property of the container assessable description 414 will fail to satisfy the policy rule, because the tested "EXPOSED_PORTS" property of the container assessable description 414 has an assessed value ("80, 443") established by the example host environment 150 that does not match the expected value ("NONE") for the "EXPOSED_PORTS" property established by the policy rule.

In the illustrated example of FIG. 4, the example container assessable description assembler 410 provides the example container assessable description 414 to the example assessment engine 420. The example assessment engine 420 also obtains, receives and/or selects an example assessment policy 120. The example assessment policy 120 may be a standardized policy established by an industry to serve as a set of guidelines by which conformance to a measure of quantity, weight, extent, value and/or quality may be determined. For example, the Payment Card Industry Data Security Standard (PCI-DSS) or the Center for Internet Security (CIS) Docker Benchmark may constitute the example assessment policy 120 to be obtained, received and/or selected by the example assessment engine 420 and/or the example security assessment system 130.

In the illustrated example of FIG. 4, the example assessment policy 120 may optionally be obtained from an example assessment policy repository (not shown). Such an example assessment policy repository may maintain and/or store any number of assessment policies to be selected by the example assessment engine 420, including without limitation a single assessment policy. While FIG. 4 illustrates the example assessment policy 120 as being located separately from the example security assessment system 130, the assessment policy 120 may alternatively be located locally within the example security assessment system 130 and/or locally within the example assessment engine 420.

In the illustrated example of FIG. 4, after the example assessment engine 420 has obtained, received and/or selected the example assessment policy 120, the example assessment policy rule identifier 422 of the assessment engine 420 identifies one or more rules associated with the assessment policy 120. FIG. 7 illustrates an example assessment policy rule 702 that the example assessment policy rule identifier 422 identifies from the example assessment policy 120. In logical terms, the pseudocode illustrated in FIG. 7 provides a policy rule 702 (e.g., "oval:com.vmware.docker: def:5") whereby a property value other than "root" should be defined within the container for a "Service_User" property.

Figure 8:
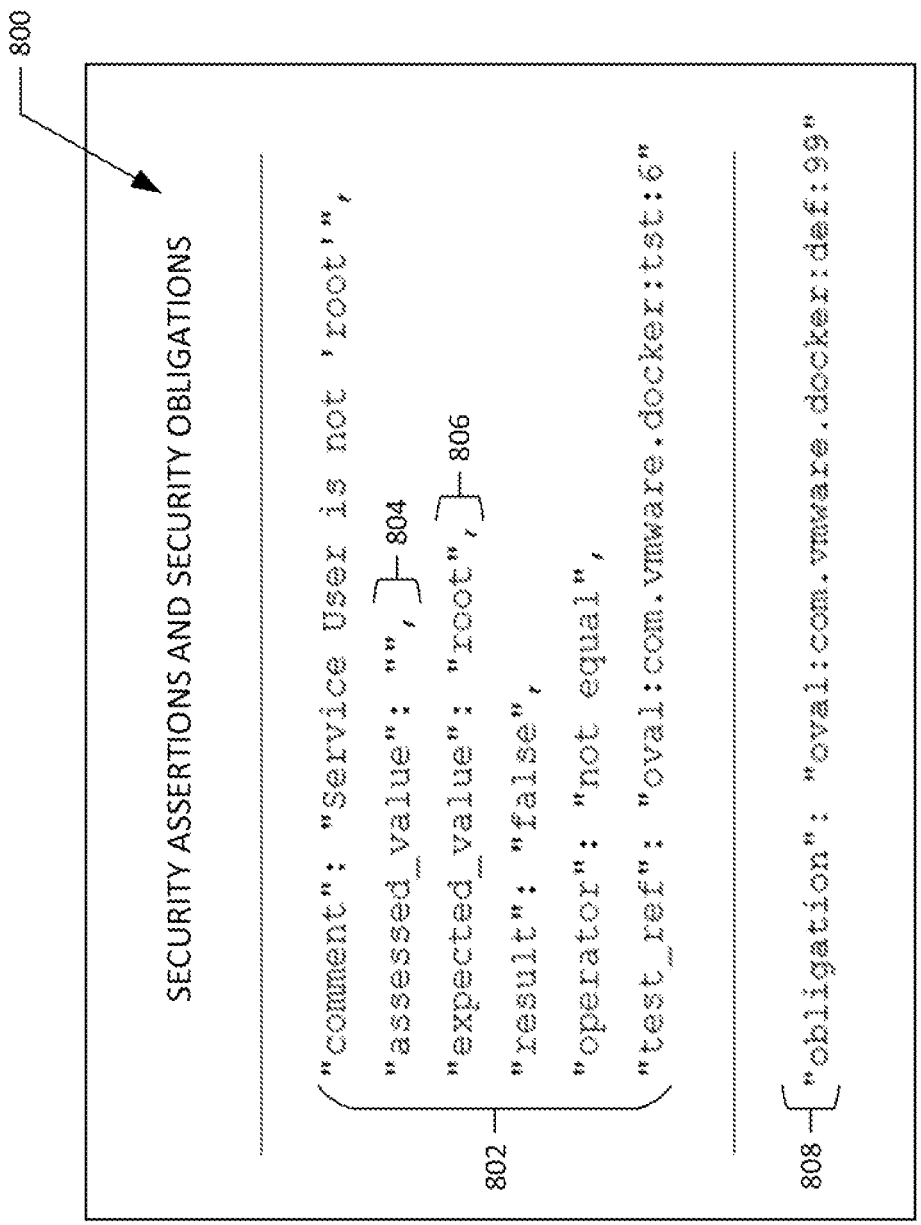
FIG. 8 illustrates example security assertions and example security obligations that may be created by the example assessment engine of FIG. 4.

In the illustrated example of FIG. 4, after the example assessment policy rule identifier 422 has identified the policy rules of the assessment policy 120, the example security assertion generator 424 of the assessment engine 420 uses the identified policy rules and the example container assessable description 414 to generate one or more security assertions associated with the example container image 110. Security assertions are generated by testing the pre-execution phase properties of the pre-execution phase parts of the example container assessable description 414. FIG. 8 illustrates a list of security assertions and security obligations 800 represented in pseudocode that includes an example security assertion 802 generated by the example security assertion generator 424. In the illustrated example, the security assertion 802 is associated with one or more pre-execution phase properties of the example pre-execution phase parts 604 described above in connection with the example container assessable description 414 of FIG. 6 The pseudocode of the illustrated example of FIG. 8 indicates that the example container assessable description 414 failed the example policy rule 702 described above in connection with FIG. 7 because the example assessed value 804 of the "Service_User" property was not defined, and therefore did not match the example expected value 806 of the "Service_ User" property. While the example security assertion 802 shown in FIG. 8 illustrates a single security assertion, any number of security assertions may be generated by the security assertion generator 424. In the example security assessment system 130, the number of security assertions generated by the example security assertion generator 424 will generally be dictated by the number of identified policy rules in the assessment policy 120 to be applied against the pre-execution phase properties of the example pre-execution phase parts 604 of the example container assessable description 414.

In the illustrated example of FIG. 4, after the example assessment policy rule identifier 424 has identified the policy rules of the assessment policy 120, the example security obligation generator 426 of the assessment engine 420 uses the identified policy rules and the example container assessable description 414 to generate one or more security obligations associated with the example container image 110. Security obligations are deferred tests that are constructed based on the execution phase properties of the example execution phase parts 612 of the example container assessable description 414. As described above in connection with FIG. 6, the example run argument 608 is one example of an execution phase part 612 having an execution phase property. The execution phase property associated with the example run argument 608 is unknown to the example assessment engine 420 before the execution phase 106 because the host environment 150 is not yet known. Thus, the execution phase property of the example run argument 608 forms the basis for the generation of a security obligation. In the illustrated example of FIG. 4, the security obligations are encoded and inserted into the example security assertion document 140 for subsequent testing during the execution phase 106, as opposed to being expressed as a security assertion for which the underlying testing has already been performed during the assessment phase 104 by the example assessment engine 420. As described in greater below in connection with FIGS. 1 and 10, during the execution phase 106 the example execution decision system 160 determines whether the security obligations contained within the example security assertion document 140 are satisfied by the example host environment 150.

In the illustrated example of FIG. 8, the example security obligation 808 is generated by the example security obligation generator 426. In the illustrated example, the security obligation 808 is associated with one or more execution phase properties of the example execution phase parts 612 described above in connection with the example container assessable description 414 of FIG. 6. In the illustrated example, the security obligation 808 is expressed as a test identification ("oval:com.vmware.docker:def:99") for a policy rule that has not yet been tested by the example assessment engine 420. While the example security obligation 808 shown in FIG. 8 illustrates a single security obligation, any number of security obligations may be generated by the security obligation generator 426. In the example security assessment system 130, the number of security obligations generated by the example security obligation generator 426 will generally be dictated by the number of identified policy rules to be applied against the execution phase properties of the example execution phase parts 612 of the example container assessable description 414. In instances where the container assessable description 414 does not include any execution phase properties and/or execution phase parts 612, the example security obligation generator 426 will not generate any security obligations.

In the illustrated example of FIG. 4, the example security assertion document generator 430 obtains and/or receives the example security assertions (e.g., security assertion 802) generated by the example security assertion generator 424, the example security obligations (e.g., security obligation 808) generated by the example security obligation generator 426, the example policy rules (e.g., policy rule 702) identified by the example assessment policy rule identifier 422, and the example container assessable description 414 created and/or assembled by the example container assessable description assembler 410. Based on the obtained and/or received security assertions, security obligations, policy rules and container assessable description, the example security assertion document generator 430 creates an example security assertion document 140 associated with the example container image 110. The example security assertion document 140 is separate from the example container image 110 such that the generation of the security assertion document 140 does not alter the form, structure, contents or properties of the container image 110.

In the illustrated example of FIG. 4, the example assessment policy identifier 432 identifies the example assessment policy 120 from which the security assertions (e.g., security assertion 802) generated by the example security assertion generator 424 and/or the security obligations (e.g., security obligation 808) generated by the example security obligation generator 426 were derived. After the example assessment policy identifier 432 identifies the assessment policy 120, the assessment policy identifier 432 creates and/or associates an assessment policy reference (e.g., assessment policy reference 904 of FIG. 9) with the assessment policy 120. The assessment policy reference allows the example execution decision system 160 and/or the example relying party 107 to identify and/or retrieve the referenced assessment policy. As described below in connection with FIG. 9, the assessment policy reference forms part of the example security assertion document 140 created by the example security assertion document generator 430.

In the illustrated example of FIG. 4, the example container image identifier 434 identifies the example container image 110 from which the example container assessable description 414 was generated, and/or from which the security assertions (e.g., security assertion 802) generated by the example security assertion generator 424 and/or the security obligations (e.g., security obligation 808) generated by the example security obligation generator 426 were derived. After the example container image identifier 434 identifies the example container image 110, the container image identifier 434 creates and/or associates a container image reference (e.g., container image reference 906 of FIG. 9) with the container image 110. The container image reference allows the example execution decision system 160 and/or the example relying party 107 to identify and/or retrieve the referenced container image 110, to verify that the correct container image 110 has been identified and/or retrieved, and/or to verify that a security assertion document (e.g., the example security assertion document 140) is associated with a particular container image (e.g., the example container image 110). As described below in connection with FIG. 9, the container image reference forms part of the example security assertion document 140 created by the example security assertion document generator 430.

In some examples, the container image reference may include a cryptographic fingerprint (e.g., cryptographic fingerprint 920 of FIG. 9) associated with the example container assessable description 414 and/or the example container image 110. The example cryptographic fingerprint generator 440 of FIG. 4 creates a cryptographic fingerprint associated with the example container assessable description 414 and/or the example container image 110 by implementing a cryptographic hash function (e.g., SHA). The cryptographic fingerprint allows the example execution decision system 160 and/or the example relying party 107 to identify and/or retrieve the referenced container image 110, to verify that the correct container image 110 has been identified and/or retrieved, and/or to verify that a security assertion document (e.g., the example security assertion document 140) is associated with a particular container image (e.g., the example container image 110). In some examples, the cryptographic fingerprint is encrypted with a cryptographic signature (e.g., cryptographic signature 918 of FIG. 9) by the example cryptographic signature generator 442 according to a digital signature algorithm (e.g., W3C XML Signature). The cryptographic signature seals the cryptographic fingerprint into the example security assertion document 140 so that the cryptographic fingerprint cannot be tampered with. As used herein, the terms "seal" and/or "sealed" refers to a cryptographic signature technique that ensures the integrity of electronic content (e.g., a cryptographic fingerprint and/or hash value) by, for example, establishing that the content was created at a specific point in time and that the content has not been tampered with since that time. In addition to sealing the cryptographic fingerprint, the cryptographic signature also provides, via a public key certificate, the identity of the entity that generated the example security assertion document 140. Thus, using a cryptographic signature provides a security measure to decrease the likelihood that the container image 110 has been substituted with another container image that has harmful components in it, and further provides a mechanism by which the example execution decision system 160 can determine whether the example security assertion document 140 was generated by a trusted entity.

In the illustrated example of FIG. 4, the example aggregator 436 groups, categorizes and/or organizes the example policy rules (e.g., policy rule 702) identified by the example assessment policy rule identifier 422, the example security assertions (e.g., security assertion 802) generated by the example security assertion generator 424, and the example security obligations (e.g., security obligation 808) generated by the example security obligation generator 426. For example, the aggregator 436 may group, categorize and/or otherwise organize all of the policy rules into a field and/or list referenced as "[Rules]." The aggregator 436 may further group, categorize and/or otherwise organize all of the security assertions into a field and/or list referenced as "[Assertions]." The aggregator 436 may further group, categorize and/or otherwise organize all of the security obligations into a field and/or list referenced as "[Obligations]." The aggregator 436 may optionally associate the grouped, categorized and/or otherwise organized policy rules, security assertions and/or security obligations with one or more links to the "[Rules]," "[Assertions]," and/or "[Obligations]" fields and/or lists. As described below in connection with FIG. 9, the grouped, categorized and/or organized policy rules, security assertions and security obligations, and/or the links associated therewith, form part of the example security assertion document 140 created by the example security assertion document generator 430.

In the illustrated example of FIG. 4, the example assessment policy conformance generator 438 creates a conformance metric (e.g., conformance metric 902 of FIG. 9) indicating the level, degree and/or extent to which the example container image 110 identified by the example container image identifier 434 conforms to the example assessment policy 120 identified by the example assessment policy identifier 432. For example, the example container assessable description 414 associated with the example container image 110 may satisfy all of, some of, or none of the policy rules associated with the example assessment policy 120. The conformance metric created by the example assessment policy conformance generator 438 is a measurement of such satisfaction. The conformance metric may be expressed in any form. As one example, the conformance metric may be expressed as a percentage or the policy rules of the example assessment policy 120 that were satisfied. As another example, the conformance metric may be expressed as a score that the example assessment policy conformance generator 438 associates with the extent to which the policy rules of the example assessment policy 120 were satisfied. As another example, the conformance metric may be expressed as a pass/fail indication that the example assessment policy conformance generator 438 associates with the extent to which the policy rules of the example assessment policy 120 were satisfied. As described below in connection with FIG. 9, in some examples, the conformance metric created by the assessment policy conformance generator 438 forms pan of the example security assertion document 140 created by the example security assertion document generator 430.

In the illustrated example of FIG. 4, the example cryptographic signature generator 442 creates a cryptographic signature (e.g., cryptographic signature 918 of FIG. 9) associated with the example security assertion document 140 by implementing a cryptographic signature algorithm (e.g., W3C XML signature) that uses a public key cryptosystem (e.g., the RSA® public key cryptosystem developed by Rivest, Shamir and Adleman). The cryptographic signature protects the integrity of the example security assertion document 140 and/or the contents thereof, and also allows the example execution decision system 160 to determine whether the example security assertion document 140 was generated by an entity that is trusted. As described below in connection with FIG. 9, in some examples, the cryptographic signature forms part of the example security assertion document 140 created by the example security assertion document generator 430.

In the illustrated example of FIG. 4, the example check system identifier 444 identifies the type of assessment engine 420 that generated the example security assertions (e.g., security assertions 802). The example check system identifier 444 identifies a check system associated with the identified type of assessment engine 420. In some examples, the identified check system is an assessment engine of the same type as the example assessment engine 420 that generated the example security assertions (e.g., security assertions 802). After the example check system identifier 444 identifies the check system, the check system identifier 444 creates and/or associates a check system reference (e.g., check system reference 916 of FIG. 9) with the check system. As discussed below in connection with FIG. 10, the check system reference allows the example execution decision system 160 and/or the example relying party 107 to identify and/or access an assessment engine of the same type as the example assessment engine 420 that generated the example security assertions (e.g., security assertions 802) for the purpose of verifying some or all of the example security assertions. In some examples, the check system reference identifies an assessment engine that is provided via a web portal hosted by a third party assessment entity that differs from the assessor 105 of FIG. 1. As described below in connection with FIG. 9, the check system reference forms part of the example security assertion document 140 created by the example security assertion document generator 430.

Figure 9:
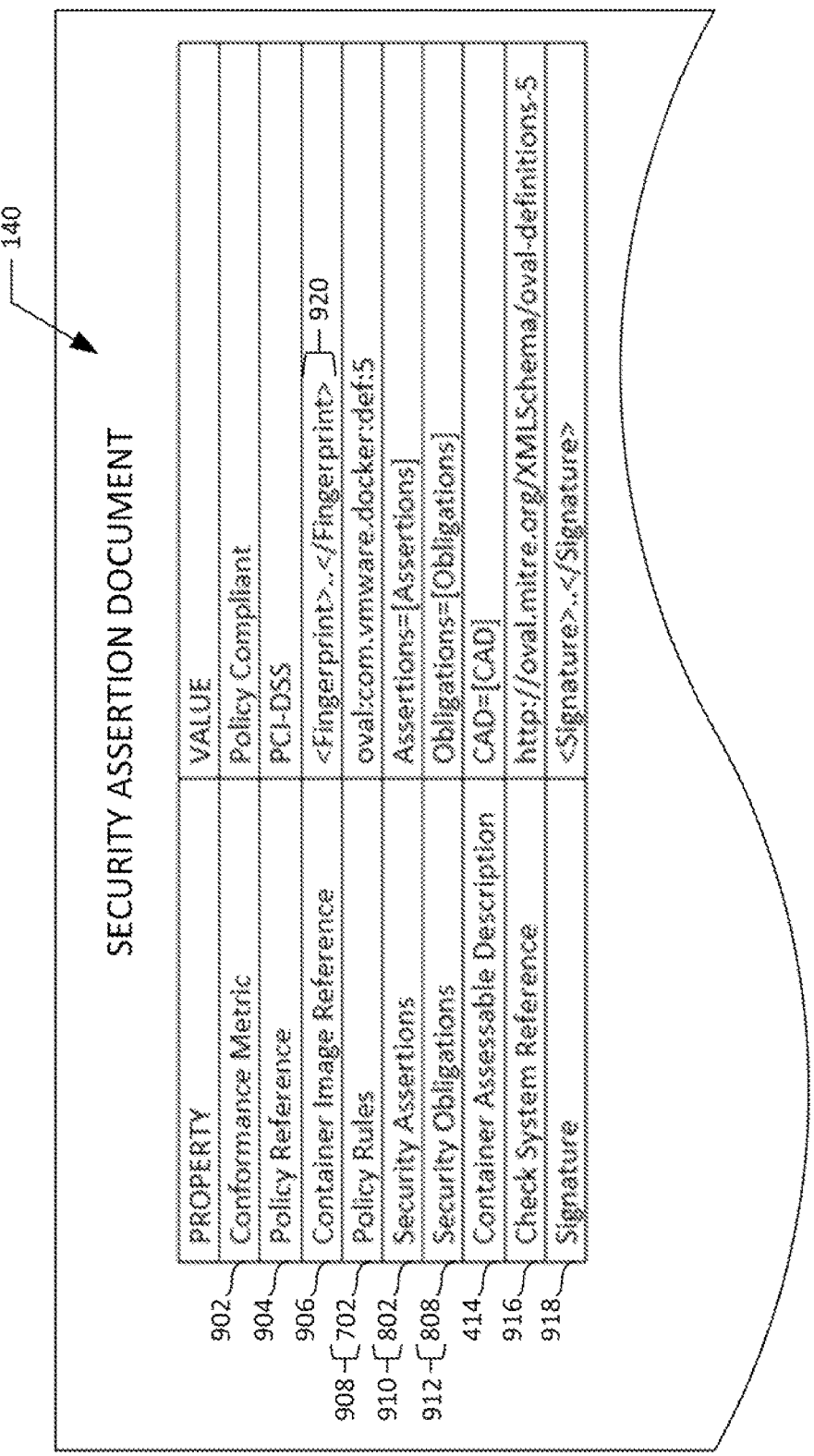
FIG. 9 illustrates an example security assertion document that may be created by the example security assertion document generator of FIG. 4.

FIG. 9 illustrates an example security assertion document 140 generated by the example security assertion document generator 430 of FIG. 4. While the example security assertion document 140 is illustrated as being of a specific form, the security assertion document may be of any form and/or file type, and may contain more or less information than what is illustrated in relation to the example security assertion document 140 of FIG. 9.

In the illustrated example of FIG. 9, the example security assertion document 140 includes an example assessment policy reference 904 indicating the example assessment policy 120 from which the security assertions (e.g., security assertion 802) generated by the example security assertion generator 424 and/or the security obligations (e.g., security obligation 808) generated by the example security obligation generator 426 were derived. In the illustrated example, the assessment policy reference 904 refers to the PCI-DSS policy. The assessment policy reference 904 allows the example execution decision system 160 and/or the example relying party 107 to identify and/or retrieve the referenced assessment policy 120.

In the illustrated example of FIG. 9, the example security assertion document 140 includes an example container image reference 906 indicating the example container image 110 from which the example container assessable description 414 was generated, and/or from which the security assertions (e.g., security assertion 802) generated by the example security assertion generator 424 and/or the security obligations (e.g., security obligation 808) generated by the example security obligation generator 426 were derived. The container image reference 906 allows the example execution decision system 160 and/or the example relying party 107 to identify and/or retrieve the referenced container image 110, to verify that the correct container image 110 has been identified and/or retrieved, and/or to verify that a security assertion document (e.g., the example security assertion document 140) is associated with a particular container image (e.g., the example container image 110). In the illustrated example, the container image reference 906 specifies an example cryptographic fingerprint 920. The cryptographic fingerprint 920 allows the example execution decision system 160 and/or the example relying party 107 to implement a security measure in the course of identifying and/or retrieving the referenced container image 110, verifying that the correct container image 110 has been identified and/or retrieved, and/or verifying that a security assertion document (e.g., the example security assertion document 140) is associated with a particular container image (e.g., the example container image 110).

In the illustrated example of FIG. 9, the example security assertion document 140 includes an example aggregated set of policy rules 908 that includes example policy rule 702 of FIG. 7, an example aggregated set of security assertions 910 that includes example security assertion 802 of FIG. 8, and an example aggregated set of security obligations 912 that includes example security obligation 808 of FIG. 8. In the illustrated example, the aggregated set of policy rules 908 is identified in the security assertion document 140 by one or more links (e.g., "oval:com.vmware.docker:def:5") associated with the aggregated policy rules 908. In the illustrated example, the aggregated set of security assertions 910 and the aggregated set of security obligations 912 respectively specify fields and/or lists "[Assertions]" and "[Obligations]" included directly within the example security assertion document 140.

In the illustrated example of FIG. 9, the example security assertion document 140 includes the example container assessable description 414 created and/or assembled by the example container assessable description assembler 410 based on the example container image 110. In the illustrated example, the example container assessable description 414 specifies a field and/or list "[CAD]" included directly within the security assertion document 140. The example container assessable description 414 may alternatively be identified in the security assertion document 140 by a link associated with the container assessable description 414.

In the illustrated example of FIG. 9, the example security assertion document 140 includes an example conformance metric 902 indicating the level, degree and/or extent to which the example container image 110 that is the subject of the security assertion document 140 conforms to the example assessment policy 120. In the illustrated example, the example conformance metric 902 indicates that the example container image 110 is compliant with the PCI-DSS policy.

In the illustrated example of FIG. 9, the example security assertion document 140 includes an example cryptographic signature 918 indicating that the example security assertion document 140 is unaltered and indicating the entity that generated the example security assertion document 140. In the illustrated example, the example cryptographic signature 918 corresponds to an entity that is recognized by the example execution decision system 160 and/or the example relying party 107 as being a trusted entity.

Figure 10:
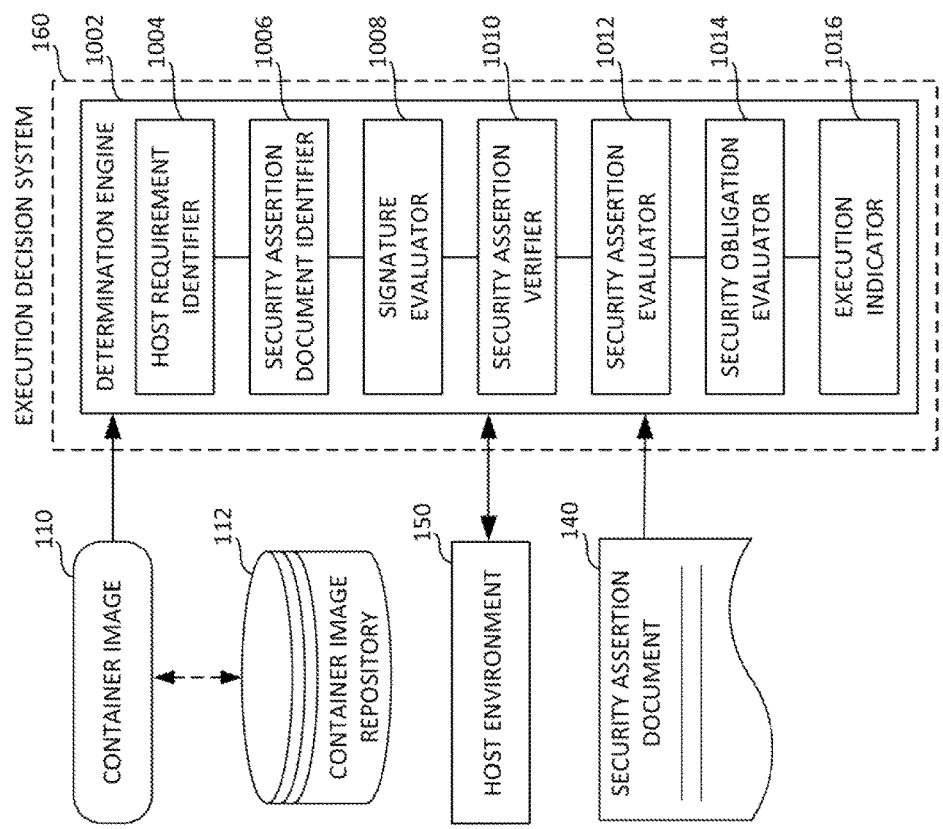
FIG. 10 shows additional detail of the example execution decision system of FIG. 1.

In the illustrated example of FIG. 9, the example security assertion document 140 includes an example check system reference 916 indicating a check system and/or an assessment engine that can be accessed by the example execution decision system 160 of FIGS. 1 and 10 to verify the accuracy of one or more of the example security assertions 910 and/or 802 relative to corresponding ones of the example policy rules 908 and/or 702. In the illustrated example, the example check system reference 916 identifies a link ("http://oval.mitre.org/XMLSchema/oval-definitions-5") to a web portal that hosts an example assessment engine.

While an example manner of implementing the example container image part identifier 412, the example assessment policy rule identifier 422, the example security assertion generator 424, the example security obligation generator 426, the example assessment policy identifier 432, the example container image identifier 434, the example aggregator 436, the example assessment policy conformance generator 438, the example cryptographic fingerprint generator 440, the example cryptographic signature generator 442, the example check system identifier 444, and/or, more generally, the example container assessable description assembler 410, the example assessment engine 420, the example security assertion document generator 430, and/or more generally the example security assessment system 130 is illustrated in FIGS. 1 and 4, one or more of the elements, processes and/or devices illustrated in FIGS. 1 and 4 may be combined, divided, re-arranged, omitted, eliminated and/or implemented in any other way. Further, the example container image part identifier 412, the example assessment policy rule identifier 422, the example security assertion generator 424, the example security obligation generator 426, the example assessment policy identifier 432, the example container image identifier 434, the example aggregator 436, the example assessment policy conformance generator 438, the example cryptographic fingerprint generator 440, the example cryptographic signature generator 442, the example check system identifier 444, and/or, more generally, the example container assessable description assembler 410, the example assessment engine 420, the example security assertion document generator 430, and/or more generally the example security assessment system 130 of FIGS. 1 and 4 may be implemented by hardware, software, firmware and/or any combination of hardware, software and/or firmware. Thus, for example, any of the example container image part identifier 412, the example assessment policy rule identifier 422, the example security assertion generator 424, the example security obligation generator 426, the example assessment policy identifier 432, the example container image identifier 434, the example aggregator 436, the example assessment policy conformance generator 438, the example cryptographic fingerprint generator 440, the example cryptographic signature generator 442, the example check system identifier 444, and/or, more generally, the example container assessable description assembler 410, the example assessment engine 420, the example security assertion document generator 430, and/or more generally the example security assessment system 130 of FIGS. 1 and 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example container image part identifier 412, the example assessment policy rule identifier 422, the example security assertion generator 424, the example security obligation generator 426, the example assessment policy identifier 432, the example container image identifier 434, the example aggregator 436, the example assessment policy conformance generator 438, the example cryptographic fingerprint generator 440, the example cryptographic signature generator 442, the example check system identifier 444, and/or, more generally, the example container assessable description assembler 410, the example assessment engine 420, the example security assertion document generator 430, and/or more generally the example security assessment system 130 of FIGS. 1 and 4 is/are hereby expressly defined to include a tangible computer readable storage device or storage disk such as a memory, a digital versatile disk (DVD), a compact disk (CD), a Blu-ray disk, etc. storing the software and/or firmware. Further still, the example security assessment system 130 may include one or more elements, processes and/or devices in addition to, or instead of, those illustrated in FIGS. 1 and 4, and/or may include more than one of any or all of the illustrated elements, processes and devices.

FIG. 10 illustrates the example execution decision system 160 of FIG. 1. The example execution decision system 160 may be used to determine whether the example container image 110 is suitable for use to assemble a corresponding container for execution in the example host environment 150. In the illustrated example, the determination by the execution decision system 160 is based on the example security assertion document 140 generated by the example security assessment system 130. In some examples, the determination by the execution decision system 160 may be based on a plurality of security assertion documents generated to assess compliance of the example container image 110. The example execution decision system 160, including any components and/or subsystems thereof, may be implemented using either a single computing system or multiple computing systems, and may be implemented using either a centralized computer architecture or a distributed computer architecture. In the illustrated example, the execution decision system 160 resides at and/or within the example host environment 150, and/or is in communication with the example host environment 150.

In the illustrated example, the execution decision system 160 includes an example determination engine 1002 having an example host requirement identifier 1004, an example security assertion document identifier 1006, an example signature evaluator 1008, an example security assertion verifier 1010, an example security assertion evaluator 1012, an example security obligation evaluator 1014 and an example execution indicator 1016. However, fewer or additional structures may be implemented to carry out one or more portions of the functionalities implemented by the example determination engine 1002, the example host requirement identifier 1004, the example security assertion document identifier 1006, the example signature evaluator 1008, the example security assertion verifier 1010, the example security assertion evaluator 1012, the example security obligation evaluator 1014, the example execution indicator 1016 and/or other structures associated with one or more additional and/or alternative functions described herein.

In the illustrated example of FIG. 10, the example host environment 150 and/or the example determination engine 1002 obtains and/or receives the example container image 110. The container image 110 may be obtained and/or received from any source, including without limitation from the example container image repository 112 described above in connection with FIGS. 1 and 2. While FIG. 10 illustrates the example container image 110 and the example container image repository 112 as being located separately from the example execution decision system 160, the container image 110 and/or the container image repository 112 may alternatively be located locally within the example execution decision system 160 and/or locally within the example determination engine 1002. In some examples, the example container image repository 112 may alternatively contain the example execution decision system 160 and/or the example determination engine 1002.

In the illustrated example of FIG. 10, the example host requirement identifier 1004 identifies any assessment policy requirements established by the example host environment 150. For example, the example host environment 150 may require that any container image (e.g., the example container image 110) to be assembled for execution as a container in the host environment 150 must be compliant with a specific assessment policy and/or a specific type of assessment policy. For example, the host environment 150 may require that any container image to be assembled for execution as a container in the host environment 150 must be compliant with the Payment Card Industry Data Security Standard (PCI-DSS). In some examples, the host environment 150 may identify more than one assessment policy and/or type of assessment policy that the example container image 110 must comply with in order for the host environment 150 to execute a corresponding container. For example, the host environment 150 may require that any container image to be assembled for execution as a container in the host environment 150 must be compliant with the Payment Card Industry Data Security Standard (PCI-DSS) and must also be compliant with the Center for Internet Security (CIS) standard. In the illustrated example of FIG. 10, the example host requirement identifier 1004 obtains and/or receives any assessment policy requirements from the example host environment 150 that are applicable to determining whether the example container image 110 is compliant for use in connection with the example host environment 150.

In the illustrated example of FIG. 10, the example security assertion document identifier 1006 identifies, obtains and/or receives any security assertion documents that are associated with the example container image 110 and further associated with one or more of the assessment policies identified by the example host requirement identifier 1004 in relation to the assessment policy requirements of the example host environment 150. For example, if the identified assessment policy requirements of the example host environment 150 dictate that the example container image 110 must be compliant with the Payment Card Industry Data Security Standard (PCI-DSS), the example security assertion document identifier 1006 will identify, obtain and/or receive any security assertion documents associated with the identified PCI-DSS assessment policy, and further associated with the example container image 110. The security assertion documents obtained and/or received by the example security assertion document identifier 1006 may be obtained and/or received from any source, including from the example security assertion document generator 430 of FIG. 4 and/or the example security assessment system 130 described above in connection with FIGS. 1 and 4.

In some examples, the security assertion document identifier 1006 determines whether a security assertion document (e.g., the example security assertion document 140 of FIG. 9) is associated with the identified assessment policy based on an assessment policy reference (e.g., the example policy reference 904 of FIG. 9) contained in the security assertion document. For example, in connection with the example security assertion document 140 of FIG. 9, the example policy reference 904 identifies the PCI-DSS standard as the assessment policy to which the example security assertion document 140 relates. Based on the example policy reference 904 being indicative of the PCI-DSS assessment policy, the example security assertion document identifier 1006 identifies the example security assertion document 140 as being associated with the identified assessment policy requirements of the host environment 150.

When the example security assertion document identifier 1006 has determined that a security assertion document (e.g., the example security assertion document 140 of FIG. 9) is associated with the identified assessment policy requirements of the host environment 150, the security assertion document identifier 1006 determines whether the security assertion document is also associated with the example container image 110. In some examples, the security assertion document identifier 1006 determines whether a security assertion document (e.g., the example security assertion document 140 of FIG. 9) is associated with the example container image 110 based on a container image reference (e.g., the example container image reference 906 of FIG. 9) contained in the security assertion document (e.g., the example security assertion document 140). For example, if the example container image reference 906 is indicative of the example container image 110, the example security assertion document identifier 1006 identifies the example security assertion document 140 as being associated with the example container image 110. In such an example, the example container image reference 906 of the example security assertion document 140 indicates that the example container image 110 has been assessed for compliance with one or more assessment policies (e.g., the example assessment policy 120). The example security assertion document identifier 1006 obtains and/or receives any security assertion documents that have been identified as being associated with both the identified assessment policy requirements of the host environment 150 and the example container image 110.

In some examples, the security assertion documents to be identified, obtained and/or received by the example security assertion document identifier 1006 may reside with and/or be co-located with the source of example container image 110 (e.g., the example container image repository 112). In such examples, it may be unnecessary for the example security assertion document identifier 1006 to utilize the example container image reference 906 to identify, obtain and/or receive the associated security assertion documents. For example, the security assertion document identifier 1006 may alternatively determine that any security assertion documents that reside with and/or are co-located with the example container image 110 are associated with the example container image 110. In other examples, the source of the example container image 110 (e.g., the example container image repository 112, and/or the entity that is providing and/or making the example container image 110 accessible to the example host environment 150 and/or the example determination engine 1002) may identify and/or provide the example security assertion document identifier 1006 with the security assertion documents that are associated with the example container image 110. In such examples, the example security assertion document identifier 1006 is informed of an association between the example container image 110 and one or more security assertion documents, and the security assertion document identifier 1006 may in such examples need only evaluate whether the identified security assertion document(s) are further associated with the identified assessment policy requirements of the example host environment 150, as described above (e.g., by evaluating an assessment policy reference contained in the security assertion document relative to the assessment policy requirements of the example host environment 150).

In the illustrated example of FIG. 10, the example determination engine 1002 determines whether the example container image 110 is suitable for use to assemble a corresponding container for execution in the example host environment 150 based on the contents of the security assertion documents that have been identified, obtained and/or received by the example security assertion document identifier 1006. The contents of any security assertion document (e.g., the example security assertion document 140) may include any or all of the example parts described above in connection with FIGS. 4 and 9, including without limitation the example container assessable description 414, the example container image reference 906, the example cryptographic fingerprint 920, the example assessment policy reference 904, the example policy rules 908 and/or 702, the example security assertions 910 and/or 802, the example security obligations 912 and/or 808, the example conformance metric 902, the example check system reference 916, and/or the example cryptographic signature 918.

In the illustrated example of FIG. 10, the example signature evaluator 1008 determines whether the security assertion document(s) obtained and/or received by the example security assertion document identifier 1006 have a cryptographic signature including a cryptographic fingerprint that matches a cryptographic fingerprint of the container image 110 and/or the container assessable description associated with the example container image 110. For example, the example security assertion document 140 of FIG. 9 contains an example cryptographic signature 918. As described above in connection with FIGS. 4 and 9, the example cryptographic signature 918 includes a sealed cryptographic fingerprint (e.g., the example cryptographic fingerprint 920) that represents and/or constitutes a hash value of the example container assessable description 414 and/or the example container image 110. In the illustrated example, such a hash value is generated by the example cryptographic fingerprint generator 440, the example cryptographic signature generator 442, and/or, more generally, the example security assertion document generator 430. After the example host environment 150 has obtained and/or received the example container image 110, the example signature evaluator 1008 generates a hash value associated with the container image 110 and/or its associated container assessable description. The example signature evaluator 1008 then determines whether the hash value (e.g., the cryptographic fingerprint of the example container image 110 and/or its associated container assessable description) matches the hash value associated with the example cryptographic fingerprint 920 that is sealed into the example cryptographic signature 918 of the example security assertion document 140. If the hash values and/or fingerprints do not match, the example signature evaluator 1008 deletes, segregates and/or otherwise removes from consideration by the example determination engine 1002 the security assertion document 140 corresponding to the non-matching cryptographic fingerprint 920. In a similar manner, the example signature evaluator 1008 deletes, segregates and/or otherwise removes any security assertion document(s) having cryptographic fingerprints that do not match the hash values and/or fingerprints generated by the signature evaluator 1008.

In the illustrated example of FIG. 10, the example signature evaluator 1008 also determines whether the remaining security assertion documents (e.g., those security assertion documents that have been obtained and/or received by the example security assertion document identifier 1006, and which have not been deleted, segregated and/or otherwise removed from the example determination engine 1002 by the example signature evaluator 1008) contain a cryptographic signature (e.g., the example cryptographic signature 918 of FIG. 9) indicating that the security assertion document was generated by an entity that is trusted by the example determination engine 1002 and/or the example host environment 150. If the example signature evaluator 1008 determines that the cryptographic signature 918 is associated with a trusted entity and that the example security assertion document 140 is intact, the example determination engine 1002 uses this information to determine that the example container image 110 is suitable for use to assemble a corresponding container for execution in the example host environment 150. If the example signature evaluator 1008 determines that the cryptographic signature 918 is associated with an entity that is not trusted or that the example security assertion document 140 has been altered, the example determination engine 1002 may determine that the example container image 110 is not suitable for use to assemble a corresponding container for execution in the example host environment 150. Additionally or alternatively, the example determination engine 1002 may require that the security assertions (e.g., the example security assertions 910 and/or 802) contained in any security assertion document(s) generated by an untrusted entity be verified and/or retested by the example security assertion verifier 1010, as described below.

In the illustrated example of FIG. 10, the example security assertion verifier 1010 verifies the accuracy of any security assertions contained in and/or referenced by any remaining security assertion document(s) generated by an untrusted entity. For example, if the cryptographic signature 918 of the example security assertion document 140 indicated that the security assertion document 140 was generated by an untrusted entity, the example security assertion verifier 1010 tests the pre-execution phase properties of the pre-execution phase parts 604 of the example container assessable description 414 against corresponding ones of the policy rules of the example assessment policy 120 in a manner substantially similar to the testing previously conducted by the example assessment engine 420 and/or the example security assertion generator 424 in connection with creating the security assertion document 140. Therefore, the security assertions that result from the verification testing performed by the example security assertion verifier 1010 should match the security assertions 910 and/or 802 in and/or referenced by the security assertion document 140 if the example container image 110, the example container assessable description 414, and the policy rules of the example assessment policy 120 have not been altered. In some examples, the security assertion verifier 1010 utilizes the example check system reference 916 included in the example security assertion document 140 to identify and/or access an assessment engine to facilitate the verification of one or more of the example security assertions 910 and/or 802 in and/or referenced by the security assertion document 140.

In examples where the security assertions produced by the security assertion verifier 1010 do not match the security assertions 910 and/or 802 in and/or referenced by the security assertion document 140, the example determination engine 1002 may determine that the example container image 110 is not suitable for use to assemble a corresponding container for execution in the example host environment 150. In some examples, the example determination engine 1002 additionally and/or alternatively evaluates whether the security assertions produced by the security assertion verifier 1010 satisfy the assessment policies identified by the example host requirement identifier 1004 in connection with the identified assessment policy requirements of the example host environment 150. If the security assertions produced by the security assertion verifier 1010 do not satisfy the assessment policies identified by the example host requirement identifier 1004, the example determination engine 1002 determines that the example container image 110 is not suitable for use to assemble a corresponding container for execution in the example host environment 150.

In the illustrated example of FIG. 10, the example security assertion evaluator 1012 determines whether the remaining security assertion documents (e.g., those security assertion documents that have been obtained and/or received by the example security assertion document identifier 1006, which have not been deleted, segregated and/or otherwise removed from the example determination engine 1002 by the example signature evaluator 1008, and which have a cryptographic signature indicative of a trusted entity) satisfy the assessment policies identified by the example host requirement identifier 1004 in connection with the identified assessment policy requirements of the example host environment 150. For example, if the security assertion document(s) (e.g., the example security assertion document 140) contain a conformance metric (e.g., the example conformance metric 902 of FIG. 9) indicating that the example container image 110 conforms with and/or satisfies an assessment policy (e.g., the PCI-DSS assessment policy, as indicated by the example policy reference 904 of FIG. 9) identified by the example host requirement identifier 1004, the example security assertion evaluator 1012, and/or, more generally, the example determination engine 1002, determines that the example container image 110 is suitable for use to assemble a corresponding container for execution in the example host environment 150. If the example security assertion document 140 contains a conformance metric indicating that the example container image 110 fails to conform with and/or satisfy an assessment policy identified by the example host requirement identifier 1004, the example security assertion evaluator 1012, and/or, more generally, the example determination engine 1002, determines that the example container image 110 is not suitable for use to assemble a corresponding container for execution in the example host environment 150.

In the illustrated example of FIG. 10, the example security assertion evaluator 1012 may additionally and/or alternatively analyze the security assertions (e.g., the example security assertions 910 and/or 802) contained in and/or referenced by a security assertion document (e.g., the example security assertion document 140) to identify which of the security assertions indicate that a particular property or part of the associated container image 110 satisfied a particular policy rule of an assessment policy (e.g., the example assessment policy 120). In this regard, the example security assertion evaluator 1012 provides a more granular analysis mechanism for the example determination engine 1002 in comparison to, for example, the determination engine 1002 simply basing its determination on the example conformance metric 902 contained in the security assertion document 140. The example determination engine 1002 may rely upon the example security assertion evaluator 1012 in connection with determining whether the example container image 110 is suitable for use to assemble a corresponding container for execution in the example host environment 150. For example, the determination engine 1002 may determine that an analysis returned by the example security assertion evaluator 1012 for a particular property or unassembled part of the associated container image 110 is dispositive with regard to determining whether the example container image 110 is suitable for use to assemble a corresponding container for execution in the example host environment 150.

In the illustrated example of FIG. 10, the example security obligation evaluator 1014 determines whether any of the remaining security assertion documents (e.g., those security assertion documents that have been obtained and/or received by the example security assertion document identifier 1006, which have not been deleted, segregated and/or otherwise removed from the example determination engine 1002 by the example signature evaluator 1008, and which have security assertions that satisfy the assessment policies identified by the example host requirement identifier 1004) contain any security obligations (e.g., the example security obligations 912 and/or 808 contained in and/or referenced by the example security assertion document 140). The example security obligation evaluator 1014 tests the example host environment 150 to determine whether any identified security obligations satisfy corresponding ones of the policy rules (e.g., the example policy rules 908 and/or 702) of the associated assessment policy (e.g., the example assessment policy 120) identified by the example host requirement identifier 1004, and/or contained in and/or referenced by the example security assertion document 140. Unlike the example assessment engine 420 and/or the example security obligation generator 426 of the example security assessment system 130 described above in connection with FIG. 4, the example security obligation evaluator 1014 is able to test the security obligations (e.g., the example security obligations 912 and/or 808 contained in and/or referenced by the example security assertion document 140) during the execution phase 106 (FIG. 1) because the example security obligation evaluator 1014 of the example determination engine 1002 is located at and/or in the example host environment 150, or is in communication with the example host environment 150. Thus, the execution phase parts 612 (FIG. 6) and execution phase properties of the example container assessable description 414 (FIGS. 4 and 6) are now available for testing by the example security obligation evaluator 1014 in the execution phase 106.

The example determination engine 1002 may rely upon the example security obligation evaluator 1014 in connection with determining whether the example container image 110 is suitable for use to assemble a corresponding container for execution in the example host environment 150. For example, if the example security obligation evaluator 1014 determines that a sufficient number, amount and/or percentage of the identified security obligations are satisfied (e.g., sufficient to result in and/or determine a conformance metric value indicating that the example container image 110 conforms to the example assessment policy 120) in the example host environment 150, the example security obligation evaluator 1014, and/or, more generally, the example determination engine 1002, determines that the example container image 110 is suitable for use to assemble a corresponding container for execution in the example host environment 150. If the example security obligation evaluator 1014 determines that an insufficient number, amount and/or percentage of the identified security obligations are satisfied in the example host environment 150, the example security obligation evaluator 1014, and/or, more generally, the example determination engine 1002, determines that the example container image 110 is not suitable for use to assemble a corresponding container for execution in the example host environment 150.

In the illustrated example of FIG. 10, the example execution indicator 1016 generates an indication corresponding to analyses, evaluations and/or determinations performed by the example signature evaluator 1008, the example security assertion verifier 1010, the example security assertion evaluator 1012, the example security obligation evaluator 1014, and/or, more generally, by the example security determination engine 1002. For example, if the example determination engine 1002 determines that the example container image 110 is suitable for use to assemble a corresponding container (e.g., the example container 310 of FIG. 3) for execution in the example host environment 150, the example execution indicator 1016 provides an indication to and/or for the example execution decision system 160 and/or the example host environment 150 to use the example container image 110 to assemble a corresponding container for execution in the example host environment 150. If the example determination engine 1002 determines that the example container image 110 is not suitable for use to assemble a corresponding container for execution in the example host environment 150, the example execution indicator 1016 provides an indication to and/or for the example execution decision system 160 and/or the example host environment 150 to block the example container image 110 from being used to assemble a corresponding container for execution in the example host environment 150.

In the illustrated example, the previously unassembled parts 502, 602 of the container image 110 may be assembled to execute the container image 110 as a container in the example host environment 150 based on the indication provided by the example execution indicator 1016 and/or the determination made by the example determination engine 1002. For example, if the determination engine 1002 determines that the example container image 110 is suitable for use to assemble a corresponding container for execution in the example host environment 150, then the example execution decision system 160 and/or the example host environment 150, will assemble the previously unassembled parts of the container image 110 to execute as a container in the host environment 150.

While an example manner of implementing the example host requirement identifier 1004, the example security assertion document identifier 1006, the example signature evaluator 1008, the example security assertion verifier 1010, the example security assertion evaluator 1012, the example security obligation evaluator 1014, the example execution indicator 1016, and/or, more generally, the example determination engine 1002, and/or, more generally, the example execution decision system 160 is illustrated in FIGS. 1 and 10, one or more of the elements, processes and/or devices illustrated in FIGS. 1 and 10 may be combined, divided, re-arranged, omitted, eliminated and/or implemented in any other way. Further, the example host requirement identifier 1004, the example security assertion document identifier 1006, the example signature evaluator 1008, the example security assertion verifier 1010, the example security assertion evaluator 1012, the example security obligation evaluator 1014, the example execution indicator 1016, and/or, more generally, the example determination engine 1002, and/or, more generally, the example execution decision system 160 of FIGS. 1 and 10 may be implemented by hardware, software, firmware and/or any combination of hardware, software and/or firmware. Thus, for example, any of the example host requirement identifier 1004, the example security assertion document identifier 1006, the example signature evaluator 1008, the example security assertion verifier 1010, the example security assertion evaluator 1012, the example security obligation evaluator 1014, the example execution indicator 1016, and/or, more generally, the example determination engine 1002, and/or, more generally, the example execution decision system 160 of FIGS. 1 and 10 could be implemented by one or more analog or digital circuit(s), logic circuits, programmable processor(s), application specific integrated circuit(s) (ASIC(s)), programmable logic device(s) (PLD(s)) and % or field programmable logic device(s) (FPLD(s)). When reading any of the apparatus or system claims of this patent to cover a purely software and/or firmware implementation, at least one of the example host requirement identifier 1004, the example security assertion document identifier 1006, the example signature evaluator 1008, the example security assertion verifier 1010, the example security assertion evaluator 1012, the example security obligation evaluator 1014, the example execution indicator 1016, and/or, more generally, the example determination engine 1002, and/or, more generally, the example execution decision system 160 of FIGS. 1 and 10 is/are hereby expressly defined to include a tangible computer readable storage device or storage disk such as a memory, a digital versatile disk (DVD), a compact disk (CD), a Blu-ray disk, etc. storing the software and/or firmware. Further still, the example execution decision system 160 of FIGS. 1 and 10 may include one or more elements, processes and/or devices in addition to, or instead of, those illustrated in FIGS. 1 and 10, and/or may include more than one of any or all of the illustrated elements, processes and devices.

Figure 11:
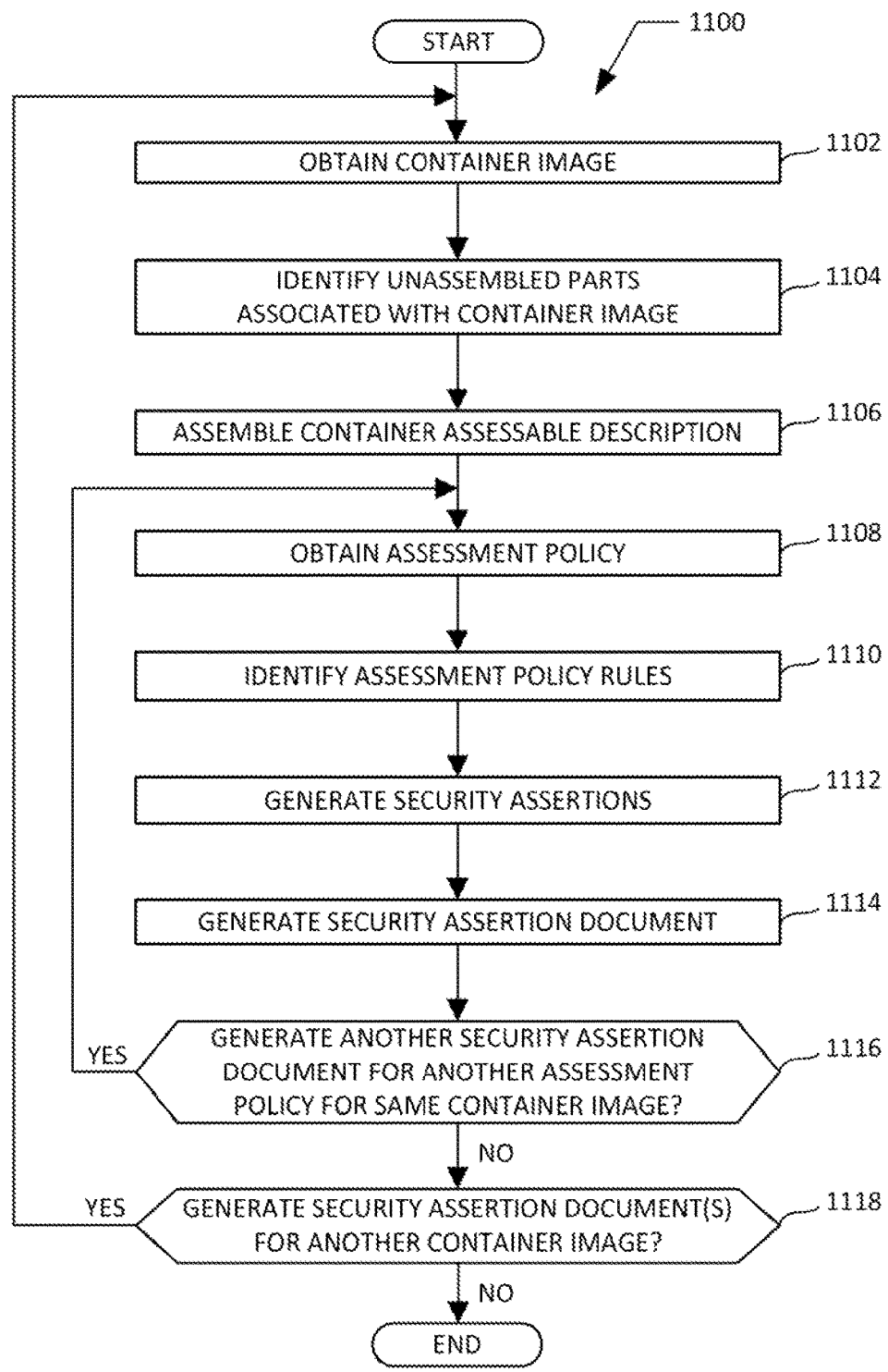
FIG. 11 is a flowchart representative of example machine-readable instructions that may be executed to implement the example security assessment system of FIGS. 1 and 4 to generate a security assertion document containing one or more security assertions.
Figure 12:
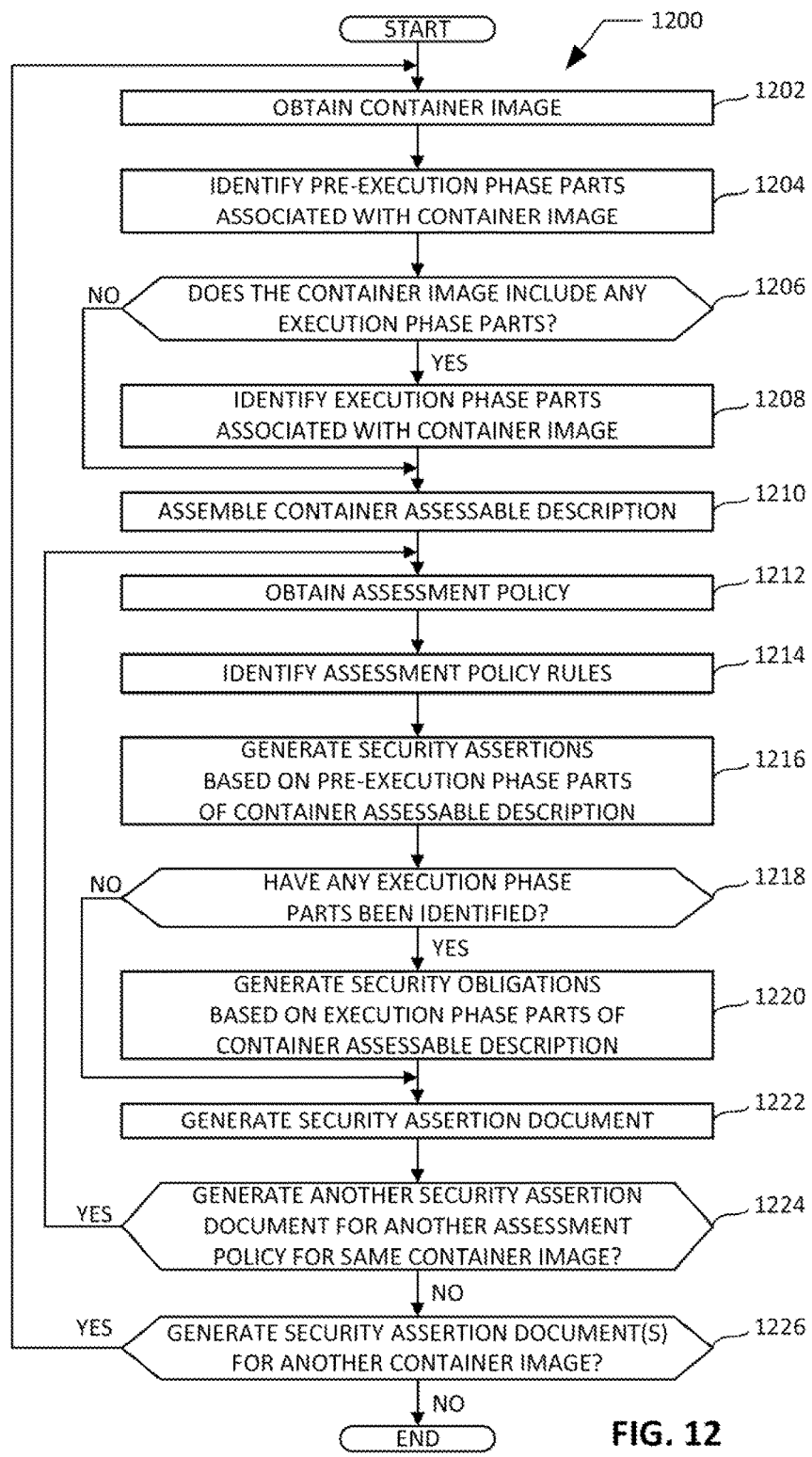
FIG. 12 is a flowchart representative of example machine-readable instructions that may be executed to implement the example security assessment system of FIGS. 1 and 4 to generate a security assertion document containing one or more security assertions and one or more security obligations.

Flowcharts representative of example machine-readable instructions for implementing the example security assessment system 130 of FIGS. 1 and 4 are shown in FIGS. 11 and 12. Flowcharts representative of example machine-readable instructions for implementing the example execution decision system 160 of FIGS. 1 and 10 are shown in FIGS. 13A-13B and 14A-14B. In these examples, the machine-readable instructions comprise one or more program(s) for execution by a processor such as the processor 1512 shown in the example processor platform 1500 discussed below in connection with FIG. 15 and/or the processor 1612 shown in the example processor platform 1600 discussed below in connection with FIG. 16. The one or more program(s) may be embodied in software stored on a tangible computer readable storage medium such as a CD-ROM, a floppy disk, a hard drive, a digital versatile disk (DVD), a Blu-ray disk, or a memory associated with the processor 1512, 1612, but the entire program(s) and/or parts thereof could alternatively be executed by a device other than the processor 1512, 1612 and/or embodied in firmware or dedicated hardware. Further, although the example program(s) is/are described with reference to the flowcharts illustrated in FIGS. 11, 12, 13A-13B and 14A-14B, many other methods of implementing the example security assessment system 130 and/or the example execution decision system 160 may alternatively be used. For example, the order of execution of the blocks may be changed, and/or some of the blocks described may be changed, eliminated, or combined.

As mentioned above, the example processes of FIGS. 11, 12, 13A-13B and/or 14A-14B may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 11, 12, 13A-13B and/or 14A-14B may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 1 is a flowchart representative of example machine-readable instructions 1100 that may be executed to implement the example security assessment system 130 of FIGS. 1 and 4 to generate the example security assertion document 140 (FIGS. 1, 4 and 9) containing one or more security assertions (e.g., the example security assertions 910 of FIG. 9 and/or the example security assertion 802 of FIG. 8). The example program 1100 begins when the example container assessable description assembler 410 of FIG. 4 obtains and/or receives the example container image 110 of FIGS. 1, 2 and 4 (block 1102). The example container image part identifier 412 of FIG. 4 identifies one or more unassembled parts associated with the example container image 110 (block 1104). For example, the container image part identifier 412 may identify the example unassembled parts 502 shown in FIG. 5 that are specified in the example container image 110. The example container assessable description assembler 410 creates and/or assembles the example container assessable description 414 of FIGS. 4 and 5 associated with the example container image 110 (block 1106). For example, the container assessable description 414 may specify the example unassembled parts 502 as shown in FIG. 5.

The example assessment engine 420 of FIG. 4 obtains the example assessment policy 120 of FIGS. 1, 4 and 7 (block 1108). For example, the assessment engine 420 may receive or retrieve the assessment policy 120 from the example assessment policy repository described above in connection with FIG. 4. In some example, the assessment engine 420 selects the assessment policy 120 from a plurality of assessment policies stored in the assessment policy repository. The example policy rule identifier 422 of FIG. 4 identifies one or more rules in the example assessment policy 120 (block 1110). For example, the policy rule identifier 422 may identify the example policy rule 702 of the example assessment policy 120 shown in FIG. 7. The example security assertion generator 424 of FIG. 4 generates one or more security assertions (block 1112). For example, the security assertion generator 424 may generate the example security assertions 910 (FIG. 9) and/or the example security assertion 802 (FIG. 8) associated with the example container image 110 and/or associated with the example container assessable description 414 that was created and/or assembled by the example container assessable description assembler 410.

The example security assertion document generator 430 of FIG. 4 generates the example security assertion document 140 (block 1114). For example, the security assertion document 140 to be generated by the security assertion document generator 430 at block 1114 may include one or more of: the example container image reference 906 indicative of the example container image 110, the example assessment policy reference 904 indicative of the example assessment policy 120, the example container assessable description 414 created and/or assembled by the example container assessable description assembler 410, the example policy rules 908 identified by the example assessment policy rule identifier 422, the example security assertions 910 generated by the example security assertion generator 424, the example conformance metric 902 generated by the example assessment policy conformance generator 438, the example cryptographic fingerprint 920 generated by the example cryptographic fingerprint generator 440, the example cryptographic signature 918 generated by the example cryptographic signature generator 442, and/or the example check system reference 916 identified by the example check system identifier 444. The generation of each such component of the security assertion document 140 is described above in connection with FIGS. 4 and 9.

The security assessment system 130 determines whether another, different, security assertion document 140 is to be generated for another, different, example assessment policy 120 using the same example container image 110 (block 1116). If the security assessment system 130 determines that another security assertion document 140 is to be generated, control of the example process of FIG. 11 returns to block 1108 described above. If the security assessment system 130 determines that another security assertion document 140 is not to be generated, the example process of FIG. 11 proceeds to block 1118.

The security assessment system 130 determines whether another, different, security assertion document 140 is to be generated for another, different, example container image 110 using the same or a different example assessment policy 120 (block 1118). If the security assessment system 130 determines that another security assertion document 140 is to be generated, control of the example process of FIG. 11 returns to block 1102 described above. If the security assessment system 130 determines that another security assertion document 140 is not to be generated, the example process of FIG. 11 ends.

FIG. 12 is a flowchart representative of example machine-readable instructions 1200 that may be executed to implement the example security assessment system 130 of FIGS.

1 and 4 to generate the example security assertion document 140 (FIGS. 1, 4 and 9) containing one or more security assertions (e.g., the example security assertions 910 of FIG. 9 and/or the example security assertion 802 of FIG. 8) and one or more security obligations (e.g., the example security obligations 912 of FIG. 9 and/or the example security obligation 808 of FIG. 8). The example program 1200 begins when the example container assessable description assembler 410 of FIG. 4 obtains and/or receives the example container image 110 of FIGS. 1, 2 and 4 (block 1202). The example container image part identifier 412 of FIG. 4 identifies one or more pre-execution phase parts associated with the example container image 110 (block 1204). For example, the container image part identifier 412 may identify the example pre-execution phase parts 604 shown in FIG. 6 that are specified in the example container image 110.

The example container image part identifier 412 also determines whether the example container image 110 includes any execution phase parts (block 1206). If the container image part identifier 412 determines that the example container image 110 includes an execution phase part (e.g., the execution phase parts 612 of FIG. 6), the example process of FIG. 12 proceeds to block 1208, where the example container image part identifier 412 identifies one or more execution phase parts associated with the example container image 110 (block 1208). For example, the container image part identifier 412 may identify the example execution phase parts 612 shown in FIG. 6 that are specified in the example container image 110. If the example image part identifier 412 instead determines at block 1206 that the example container image 110 does not include an execution phase part, the example process of FIG. 12 proceeds to block 1210.

The example container assessable description assembler 410 creates and/or assembles the example container assessable description 414 of FIGS. 4 and 6 associated with the example container image 110 (block 1210). For example, the container assessable description 414 may specify the example pre-execution phase parts 604 and the example execution phase parts 612 in the example container assessable description 414 as shown in FIG. 6.

The example assessment engine 420 of FIG. 4 obtains the example assessment policy 120 of FIGS. 1, 4 and 7 (block 1212). For example, the assessment engine 420 may receive or retrieve the assessment policy 120 from the example assessment policy repository described above in connection with FIG. 4. In some example, the assessment engine 420 selects the assessment policy 120 from a plurality of assessment policies stored in the assessment policy repository. The example policy rule identifier 422 of FIG. 4 identifies one or more rules in the example assessment policy 120 (block 1214). For example, the policy rule identifier 422 may identify the example policy rule 702 of the example assessment policy 120 shown in FIG. 7.

The example security assertion generator 424 of FIG. 4 generates one or more security assertions based on pre-execution phase parts (e.g., the pre-execution phase parts 604 of FIG. 6) of the container assessable description 414 (block 1216). For example, the security assertion generator 424 may generate the example security assertions 910 (FIG. 9) and/or the example security assertion 802 (FIG. 8) associated with the example container image 110 and/or associated with the example container assessable description 414 that was created and/or assembled by the example container assessable description assembler 410.

The example security obligation generator 426 of FIG. 4 determines whether any execution phase parts have been identified by the example image part identifier 412 (block 1218). If the security obligation generator 426 determines that one or more execution phase parts have been identified, the example process of FIG. 12 proceeds to block 1220, where the example security obligation generator 426 generates one or more security obligations based on execution phase parts (e.g., the execution phase parts 612 of FIG. 6) of the container assessable description 414 (block 1220). For example, the security obligation generator 426 may generate the example security obligations 912 (FIG. 9) and/or the example security obligation 808 (FIG. 8) associated with the example container image 110 and/or associated with the example container assessable description 414 that was created and/or assembled by the example container assessable description assembler 410. If the example security obligation generator 426 instead determines at block 1218 that no execution phase parts have been identified, the example process of FIG. 12 proceeds to block 1222.

The example security assertion document generator 430 of FIG. 4 generates the example security assertion document 140 (block 1222). For example, the security assertion document 140 to be generated by the security assertion document generator 430 at block 1222 may include one or more of: the example container image reference 906 indicative of the example container image 110, the example assessment policy reference 904 indicative of the example assessment policy 120, the example container assessable description 414 created and/or assembled by the example container assessable description assembler 410, the example policy rules 908 identified by the example assessment policy rule identifier 422, the example security assertions 910 generated by the example security assertion generator 424, the example security obligations 912 generated by the example security obligation generator 426, the example conformance metric 902 generated by the example assessment policy conformance generator 438, the example cryptographic fingerprint 920 generated by the example cryptographic fingerprint generator 440, the example cryptographic signature 918 generated by the example cryptographic signature generator 442, and/or the example check system reference 916 identified by the example check system identifier 444. The generation of each such component of the security assertion document 140 is described above in connection with FIGS. 4 and 9.

The security assessment system 130 determines whether another, different, security assertion document 140 is to be generated for another, different, example assessment policy 120 using the same example container image 110 (block 1224). If the security assessment system 130 determines that another security assertion document 140 is to be generated, control of the example process of FIG. 12 returns to block 1212 described above. If the security assessment system 130 determines that another security assertion document 140 is not to be generated, the example process of FIG. 12 proceeds to block 1226.

The security assessment system 130 determines whether another, different, security assertion document 140 is to be generated for another, different, example container image 110 using the same or a different example assessment policy 120 (block 1226). If the security assessment system 130 determines that another security assertion document 140 is to be generated, control of the example process of FIG. 12 returns to block 1202 described above. If the security assessment system 130 determines that another security assertion document 140 is not to be generated, the example process of FIG. 12 ends.

Figure 13A:
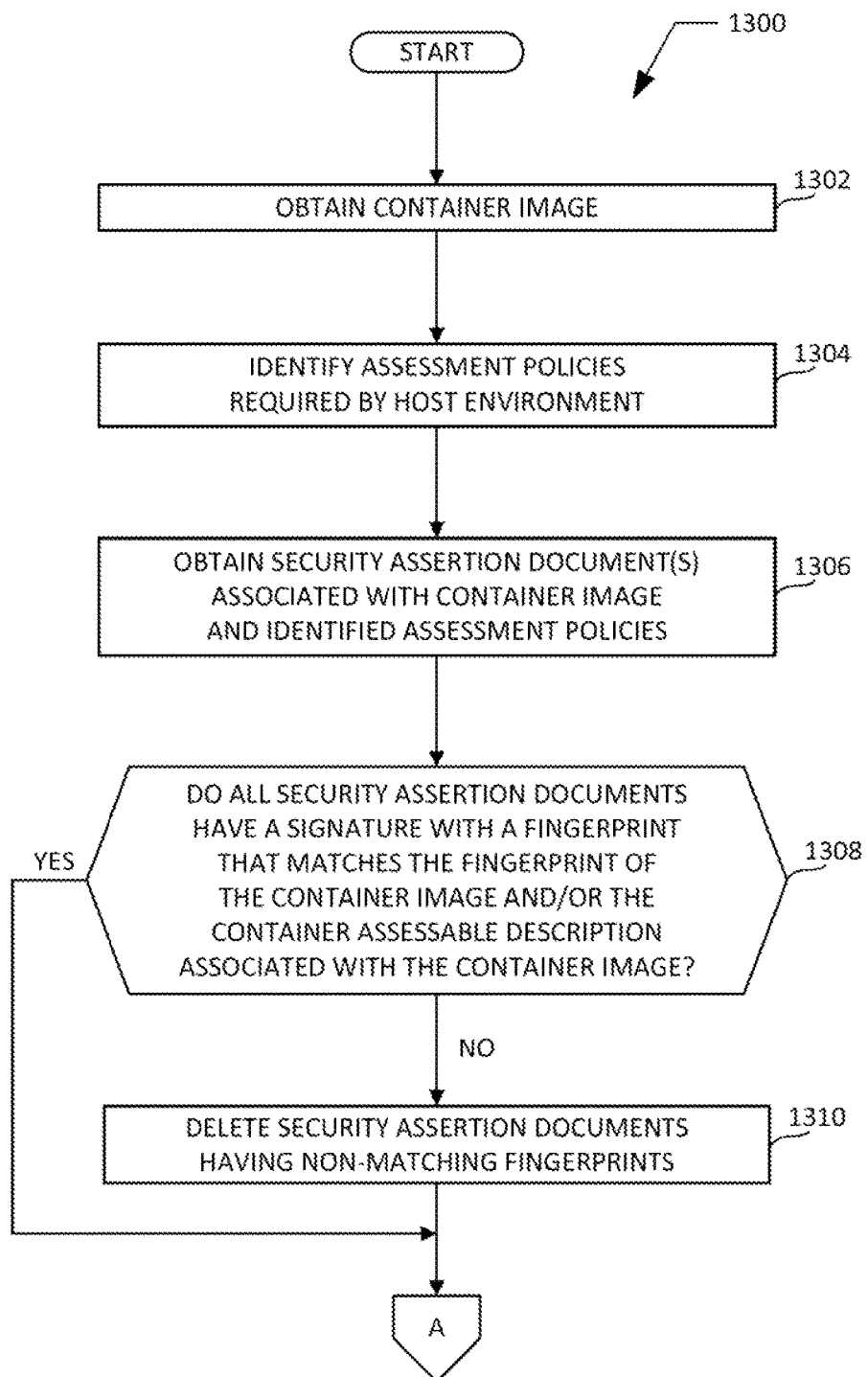
FIGS. 13A and 13B are flowcharts representative of example machine-readable instructions that may be executed to implement the example execution decision system of FIGS. 1 and 10 to determine whether to execute a container corresponding to a container image in a host environment based on a security assertion document containing one or more security assertions.
Figure 13B:
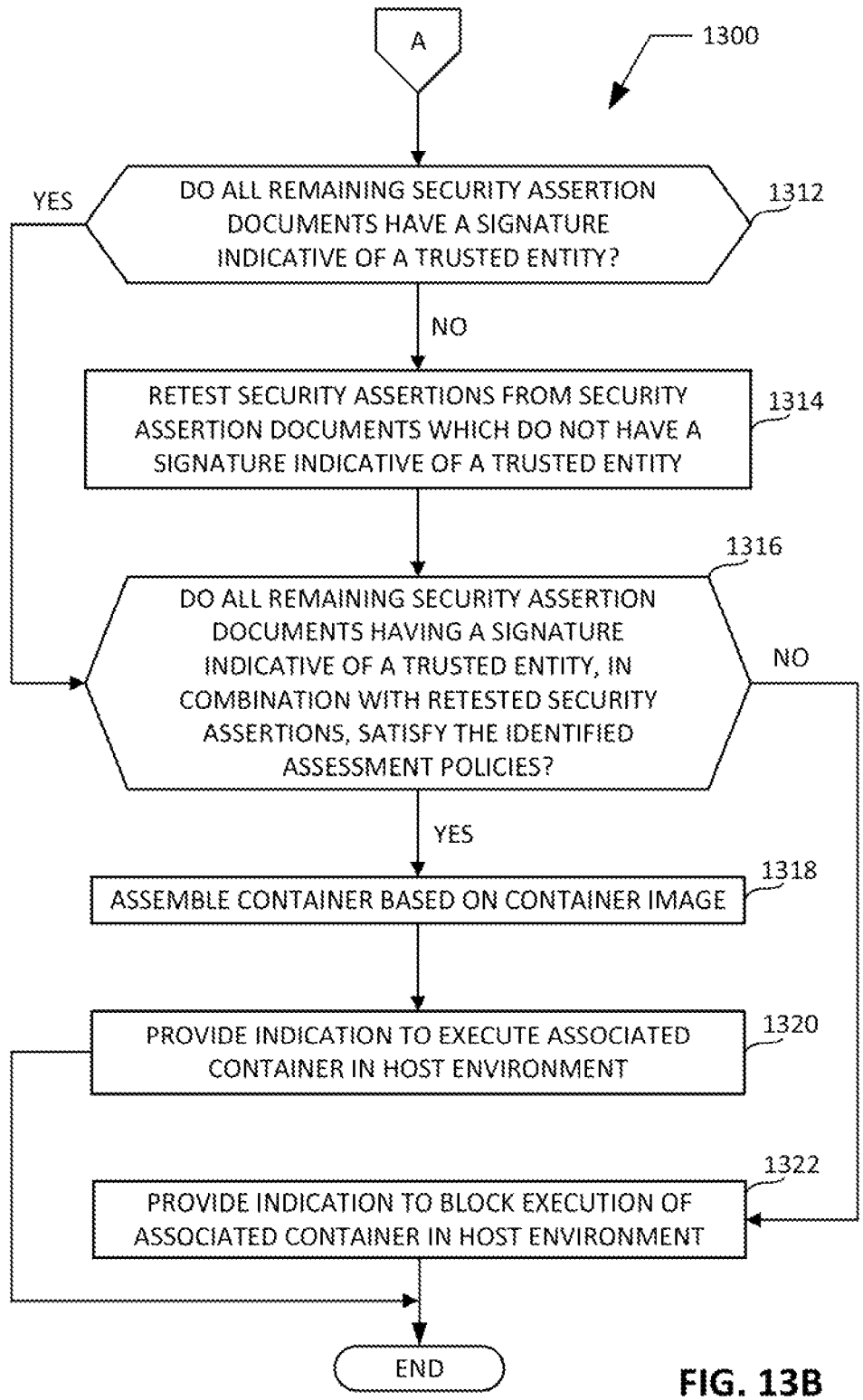

FIGS. 13A and 13B illustrate a flowchart representative of example machine-readable instructions 1300 that may be executed to implement the example execution decision system 160 of FIGS. 1 and 10 to determine whether to use the example container image 110 (FIGS. 1, 2 and 10) to assemble a corresponding container (e.g., the example container 310 of FIG. 3) for execution in the example host environment 150 (FIGS. 1, 3 and 10). In the illustrated example, the execution decision system 160 determines whether to use the container image 110 to assemble a corresponding container for execution in the example host environment 150 based on one or more security assertion documents (e.g., the example security assertion document 140 of FIGS. 1, 4, 9 and 10) containing one or more security assertions (e.g., the example security assertions 910 of FIG. 9 and/or the example security assertion 802 of FIG. 8).

The example program 1300 begins when the example host environment 150 of FIGS. 1, 3 and 10 and/or the example determination engine 1002 of FIG. 10 obtains and/or receives the example container image 110 of FIGS. 1, 2 and 10 (block 1302). The example host requirement identifier 1004 of FIG. 10 identifies the assessment policies required by the example host environment 150 (block 1304). For example, the host environment 150 may require that any container image (e.g., the example container image 110) used to assemble a container for execution in the host environment 150 must be compliant with the Payment Card Industry Data Security Standard (PCI-DSS) and/or other assessment policies. The example host requirement identifier 1004 identifies, obtains and/or receives the assessment policy requirements with which the container image 110 must comply from the example host environment 150.

The example security assertion document identifier 1006 of FIG. 10 identifies, obtains and/or receives one or more security assertion documents that are associated with the example container image 110 and further associated with one or more of the assessment policies identified by the example host requirement identifier 1004 in relation to the assessment policy requirements of the example host environment 150 (block 1306). For example, if the identified assessment policy requirements of the example host environment 150 dictate that the example container image 110 must be compliant with the Payment Card Industry Data Security Standard (PCI-DSS), the example security assertion document identifier 1006 identifies, obtains and/or receives one or more security assertion documents that were generated based on the identified PCI-DSS assessment policy and the example container image 110. The example security assertion document identifier 1006 determines whether a security assertion document (e.g., the example security assertion document 140 of FIG. 9) is associated with the identified assessment policy based on an assessment policy reference (e.g., the example policy reference 904 of FIG. 9) contained in the security assertion document. The example security assertion document identifier 1006 determines whether a security assertion document (e.g., the example security assertion document 140 of FIG. 9) is associated with the example container image 110 based on a container image reference (e.g., the example container image reference 906 of FIG. 9) and/or based on an identification provided to the example security assertion document identifier 1006 by the entity that is providing and/or making the example container image 110 accessible to the example host environment 150 and/or the example determination engine 1002.

The example signature evaluator 1008 of FIG. 10 determines whether the security assertion document(s) obtained and/or received by the example security assertion document identifier 1006 have a cryptographic signature including a cryptographic fingerprint that matches a cryptographic fingerprint generated by the example signature evaluator 1008 of the example container image 110 and/or the container assessable description associated with the example container image 110 (block 1308). If the fingerprints match, the example program 1300 proceeds to block 1312 (FIG. 13B) described below. If the fingerprints do not match, the example signature evaluator 1008 deletes, segregates and/or otherwise removes from consideration by the example determination engine 1002 the security assertion document(s) having a non-matching fingerprint (block 1310).

Turning to FIG. 13B, the example signature evaluator 1008 of FIG. 10 determines whether the remaining security assertion documents contain a cryptographic signature (e.g., the example cryptographic signature 918 of FIG. 9) indicating that the security assertion documents were generated by an entity that is trusted by the example determination engine 1002 and/or the example host environment 150 (block 1312). If the example signature evaluator 1008 determines that all of the remaining security assertion documents contain a cryptographic signature indicative of a trusted entity, the example program 1300 proceeds to block 1316 described below. If the example signature evaluator 1008 determines that any of the remaining security assertion documents do not contain a cryptographic signature indicative of a trusted entity, the example program 1300 proceeds to block 1314 described below. For example, some security assertion documents may not contain a cryptographic signature or may contain a cryptographic signature indicative of an entity that is not trusted (e.g., an untrusted entity).

The example security assertion verifier 1010 of FIG. 10 verifies and/or retests the accuracy of the security assertions contained in and/or referenced by any remaining security assertion document(s) that do not have a signature indicative of a trusted entity (block 1314). For example, if the cryptographic signature 918 of the example security assertion document 140 indicates that the security assertion document 140 was generated by an entity that is not trusted, the example security assertion verifier 1010 retests the pre-execution phase properties of the pre-execution phase parts 604 of the example container assessable description 414 against corresponding ones of the policy rules of the example assessment policy 120 in a manner substantially similar to the testing previously conducted by the example assessment engine 420 and/or the example security assertion generator 424 in connection with creating the security assertion document 140. In some examples, the security assertion verifier 1010 utilizes the example check system reference 916 (FIG. 9) included in the example security assertion document 140 to identify and/or access an assessment engine to facilitate the verification and/or retesting of one or more of the example security assertions 910 and/or 802 in and/or referenced by the security assertion document 140.

The example security assertion evaluator 1012 of FIG. 10 determines whether the remaining security assertion documents having a cryptographic signature indicative of a trusted entity, in combination with the retested security assertions from block 1314, satisfy the assessment policies identified by the example host requirement identifier 1004 in connection with the identified assessment policy requirements of the example host environment 150 (block 1316). For example, if the remaining security assertion documents (e.g., the example security assertion document 140) and retested security assertions from block 1314 contain and/or determine a conformance metric (e.g., the example conformance metric 902 of FIG. 9) indicating that the example container image 110 conforms with and/or satisfies one or more assessment policies (e.g., the PCI-DSS assessment policy, as indicated by the example policy reference 904 of FIG. 9) identified by the example host requirement identifier 1004, the example program 1300 proceeds to block 1318 described below. If any of the remaining security assertion documents (e.g., the example security assertion document 140) or retested security assertions from block 1314 contain and/or determine a conformance metric indicating that the example container image 110 fails to conform with and/or satisfy one or more assessment policies identified by the example host requirement identifier 1004, the example program 1300 proceeds to block 1322 described below.

In some examples of the program 1300, the example security assertion evaluator 1012 of FIG. 10 may additionally and/or alternatively, at block 1316, analyze the security assertions (e.g., the example security assertions 910 and/or 802) contained in and/or referenced by the remaining security assertion documents (e.g., the example security assertion document 140) to identify which of the security assertions indicate that a particular property or part of the associated container image 110 satisfy a particular policy rule of one or more assessment policies (e.g., the example assessment policy 120). For example, the determination engine 1002 may determine that an analysis returned by the example security assertion evaluator 1012 for a particular property or unassembled part of the associated container image 110 is dispositive with regard to determining whether the example container image 110 is suitable for use to assemble a corresponding container for execution in the example host environment 150. In such examples, if the security assertion(s) of interest to the example security assertion evaluator 1012 satisfies a corresponding policy rule of one or more assessment policies identified by the example host requirement identifier 1004, the example program 1300 proceeds to block 1318 described below. If the security assertion(s) of interest to the example security assertion evaluator 1012 do not satisfy a corresponding policy rule of one or more assessment policies identified by the example host requirement identifier 1004, the example program 1300 proceeds to block 1322 described below.

The example determination engine 1002 and/or the example host environment 150 of FIG. 10 assembles an example container 310 based on the example container image 110 (block 1318). For example, the determination engine 1002 assembles the previously-unassembled parts specified in the example container image 110 to form the example container 310 of FIG. 3. After the example container 310 has been assembled, the example execution indicator 1016 of FIG. 10 generates and/or provides an indication to execute the example container 310 associated with the example container image 110 in the example host environment 150 (block 1320).

If, at block 1316, the example security assertion evaluator 1012 determined that the remaining security assertion documents, in combination with the retested security assertions from block 1314, do not satisfy the identified assessment policies, the example execution indicator 1016 of FIG. 10 generates and/or provides an indication to block the execution of an example container 310 associated with the example container image 110 in the example host environment 150 (block 1322).

The example program of FIGS. 13A and 13B ends after the example execution indicator 1016 has provided an indication as described above in connection with either of block 1320 or block 1322.

Figure 14A:
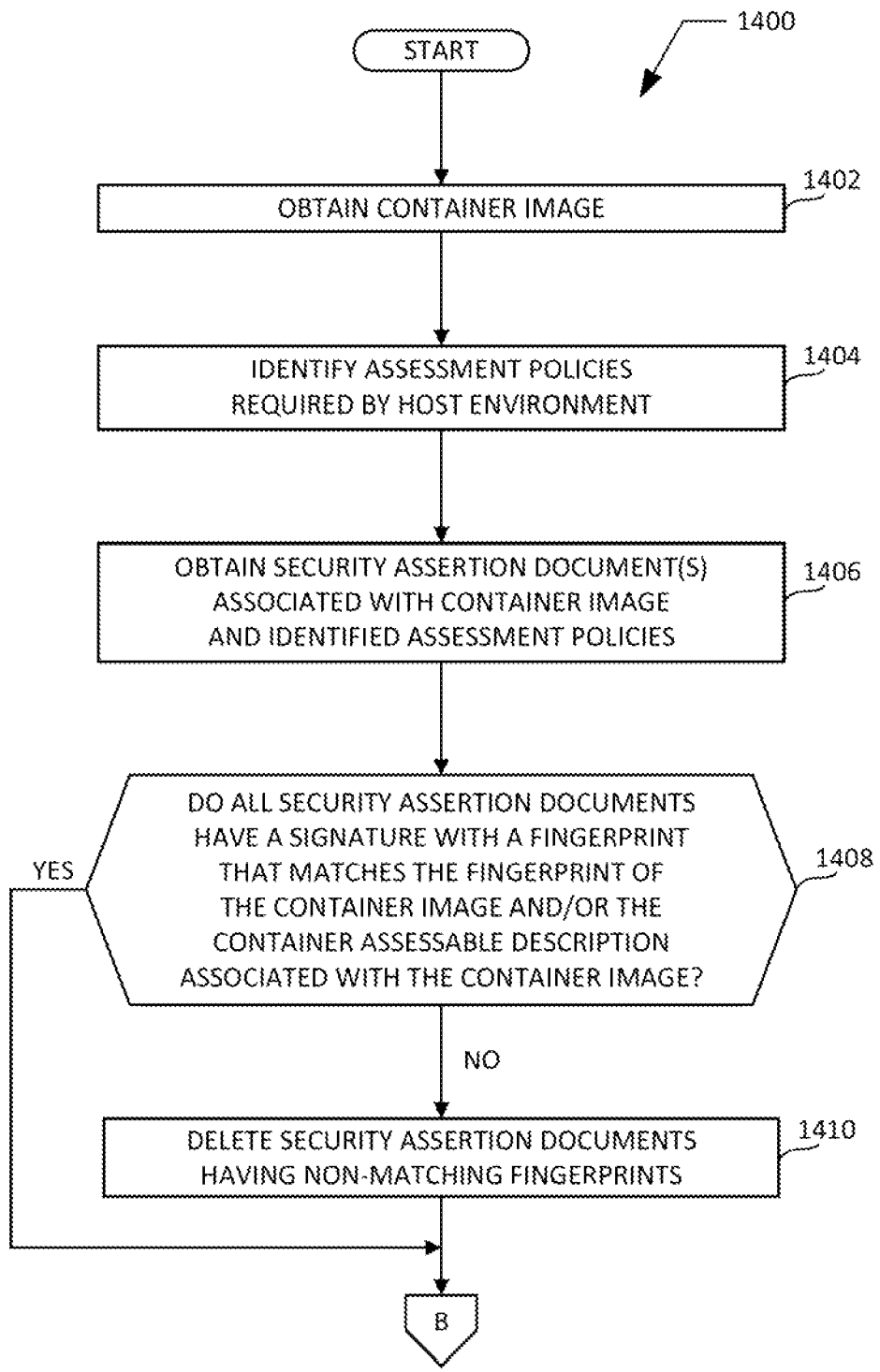
FIGS. 14A and 14B are flowcharts representative of example machine-readable instructions that may be executed to implement the example execution decision system of FIGS. 1 and 10 to determine whether to execute a container corresponding to a container image in a host environment based on a security assertion document containing one or more security assertions and one or more security obligations.
Figure 14B:
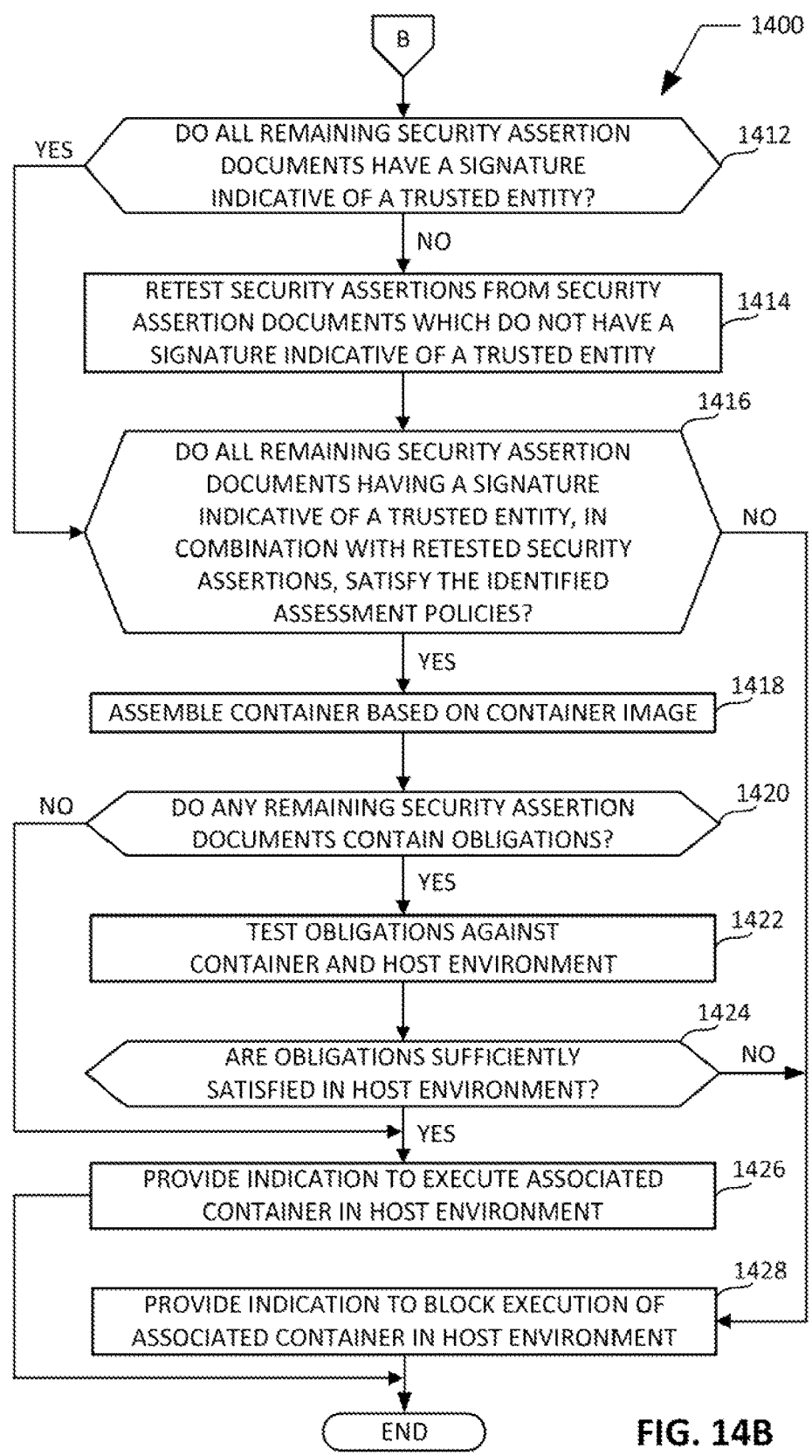

FIGS. 14A and 14B illustrate a flowchart representative of example machine-readable instructions 1400 that may be executed to implement the example execution decision system 160 of FIGS. 1 and 10 to determine whether to use the example container image 110 (FIGS. 1, 2 and 10) to assemble a corresponding container (e.g., the example container 310 of FIG. 3) for execution in the example host environment 150 (FIGS. 1, 3 and 10). In the illustrated example, the execution decision system 160 determines whether to use the container image 110 to assemble a corresponding container for execution in the example host environment 150 based on one or more security assertion documents (e.g., the example security assertion document 140 of FIGS. 1, 4, 9 and 10) containing one or more security assertions (e.g., the example security assertions 910 of FIG. 9 and/or the example security assertion 802 of FIG. 8) and one or more security obligations (e.g., the example security obligations 912 of FIG. 9 and/or the example security obligation 808 of FIG. 8).

The example program 1400 begins when the example host environment 150 of FIGS. 1, 3 and 10 and/or the example determination engine 1002 of FIG. 10 obtains and/or receives the example container image 110 of FIGS. 1, 2 and 10 (block 1402). The example host requirement identifier 1004 of FIG. 10 identifies the assessment policies required by the example host environment 150 (block 1404). For example, the host environment 150 may require that any container image (e.g., the example container image 110) use to assemble a container for execution in the host environment 150 must be compliant with the Payment Card Industry Data Security Standard (PCI-DSS) and/or other assessment policies. The example host requirement identifier 1004 identifies, obtains and/or receives the assessment policy requirements with which the container image 110 must comply from the example host environment 150.

The example security assertion document identifier 1006 of FIG. 10 identifies, obtains and/or receives one or more security assertion documents that are associated with the example container image 110 and further associated with one or more of the assessment policies identified by the example host requirement identifier 1004 in relation to the assessment policy requirements of the example host environment 150 (block 1406). For example, if the identified assessment policy requirements of the example host environment 150 dictate that the example container image 110 must be compliant with the Payment Card Industry Data Security Standard (PCI-DSS), the example security assertion document identifier 1006 identifies, obtains and/or receives one or more security assertion documents that were generated based on the identified PCI-DSS assessment policy and the example container image 110. The example security assertion document identifier 1006 determines whether a security assertion document (e.g., the example security assertion document 140 of FIG. 9) is associated with the identified assessment policy based on an assessment policy reference (e.g., the example policy reference 904 of FIG. 9) contained in the security assertion document. The example security assertion document identifier 1006 determines whether a security assertion document (e.g., the example security assertion document 140 of FIG. 9) is associated with the example container image 110 based on a container image reference (e.g., the example container image reference 906 of FIG. 9) and/or based on an identification provided to the example security assertion document identifier 1006 by the entity that is providing and/or making the example container image 110 accessible to the example host environment 150 and/or the example determination engine 1002.

The example signature evaluator 1008 of FIG. 10 determines whether the security assertion document(s) obtained and/or received by the example security assertion document identifier 1006 have a cryptographic signature including a cryptographic fingerprint that matches a cryptographic fingerprint generated by the example signature evaluator 1008 of the example container image 110 and/or the container assessable description associated with the example container image 110 (block 1408). If the fingerprints match, the example program 1400 proceeds to block 1412 (FIG. 14B) described below. If the fingerprints do not match, the example signature evaluator 1008 deletes, segregates and/or otherwise removes from consideration by the example determination engine 1002 the security assertion document(s) having a non-matching fingerprint (block 1410).

Turning to FIG. 14B, the example signature evaluator 1008 of FIG. 10 determines whether the remaining security assertion documents contain a cryptographic signature (e.g., the example cryptographic signature 918 of FIG. 9) indicating that the security assertion documents were generated by an entity that is trusted by the example determination engine 1002 and/or the example host environment 150 (block 1412). If the example signature evaluator 1008 determines that all of the remaining security assertion documents contain a cryptographic signature indicative of a trusted entity, the example program 1400 proceeds to block 1416 described below. If the example signature evaluator 1008 determines that any of the remaining security assertion documents do not contain a cryptographic signature indicative of a trusted entity, the example program 1400 proceeds to block 1414 described below. For example, some security assertion documents may not contain a cryptographic signature or may contain a cryptographic signature indicative of an entity that is not trusted (e.g., an untrusted entity).

The example security assertion verifier 1010 of FIG. 10 verifies and/or retests the accuracy of the security assertions contained in and/or referenced by any remaining security assertion document(s) that do not have a signature indicative of a trusted entity (block 1414). For example, if the cryptographic signature 918 of the example security assertion document 140 indicates that the security assertion document 140 was generated by an entity that is not trusted, the example security assertion verifier 1010 retests the pre-execution phase properties of the pre-execution phase parts 604 of the example container assessable description 414 against corresponding ones of the policy rules of the example assessment policy 120 in a manner substantially similar to the testing previously conducted by the example assessment engine 420 and/or the example security assertion generator 424 in connection with creating the security assertion document 140. In some examples, the security assertion verifier 1010 utilizes the example check system reference 916 (FIG. 9) included in the example security assertion document 140 to identify and/or access an assessment engine to facilitate the verification and/or retesting of one or more of the example security assertions 910 and/or 802 in and/or referenced by the security assertion document 140.

The example security assertion evaluator 1012 of FIG. 10 determines whether the remaining security assertion documents having a cryptographic signature indicative of a trusted entity, in combination with the retested security assertions from block 1414, satisfy the assessment policies identified by the example host requirement identifier 1004 in connection with the identified assessment policy requirements of the example host environment 150 (block 1416). For example, if the remaining security assertion documents (e.g., the example security assertion document 140) and retested security assertions from block 1314 contain and/or determine a conformance metric (e.g., the example conformance metric 902 of FIG. 9) indicating that the example container image 110 conforms with and/or satisfies one or more assessment policies (e.g., the PCI-DSS assessment policy, as indicated by the example policy reference 904 of FIG. 9) identified by the example host requirement identifier 1004, the example program 1400 proceeds to block 1418 described below. If any of the remaining security assertion documents (e.g., the example security assertion document 140) or retested security assertions from block 1414 contain and/or determine a conformance metric indicating that the example container image 110 fails to conform with and/or satisfy one or more assessment policies identified by the example host requirement identifier 1004, the example program 1400 proceeds to block 1428 described below.

In some examples of the program 1400, the example security assertion evaluator 1012 of FIG. 10 may additionally and/or alternatively, at block 1416, analyze the security assertions (e.g., the example security assertions 910 and/or 802) contained in and/or referenced by the remaining security assertion documents (e.g., the example security assertion document 140) to identify which of the security assertions indicate that a particular property or part of the associated container image 110 satisfy a particular policy rule of one or more assessment policies (e.g., the example assessment policy 120). For example, the determination engine 1002 may determine that an analysis returned by the example security assertion evaluator 1012 for a particular property or unassembled part of the associated container image 110 is dispositive with regard to determining whether the example container image 110 is suitable for use to assemble a corresponding container for execution in the example host environment 150. In such examples, if the security assertion(s) of interest to the example security assertion evaluator 1012 satisfies a corresponding policy rule of one or more assessment policies identified by the example host requirement identifier 1004, the example program 1400 proceeds to block 1418 described below. If the security assertion(s) of interest to the example security assertion evaluator 1012 do not satisfy a corresponding policy rule of one or more assessment policies identified by the example host requirement identifier 1004, the example program 1400 proceeds to block 1428 described below.

The example determination engine 1002 and/or the example host environment 150 of FIG. 10 assembles an example container 310 based on the example container image 110 (block 1418). For example, the determination engine 1002 assembles the previously-unassembled parts specified in the example container image 110 to form the example container 310 of FIG. 3. After the example container 310 has been assembled, the example security obligation evaluator 1014 and/or, more generally, the example determination engine 1002 of FIG. 10 determines whether any of the remaining security assertion documents (e.g., the example security assertion document 140) contain any security obligations (e.g., the example security obligations 912 and/or 808 contained in and/or referenced by the example security assertion document 140) (block 1420). If the example determination engine 1002 determines that any of the remaining security assertion documents contain a security obligation, the example program 1400 proceeds to block 1422 described below. If the example determination engine 1002 determines that the remaining security assertion documents do not contain a security obligation, the example program 1400 proceeds to block 1426 described below.

The example security obligation evaluator 1014 tests the example assembled container 310 in the example host environment 150 to determine whether the identified security obligations satisfy corresponding ones of the policy rules (e.g., the example policy rules 908 and/or 702) of the associated assessment policy (e.g., the example assessment policy 120) identified by the example host requirement identifier 1004, and/or contained in and/or referenced by the example security assertion document 140 (block 1422). For example, the security obligation evaluator 1014 may test the execution phase parts 612 (FIG. 6) and execution phase properties of the example container assessable description 414 (FIGS. 4 and 6) that were previously unavailable for testing. Based on the testing, the example security obligation evaluator determines whether the identified security obligations are satisfied by the example assembled container 310 in the example host environment 150 (block 1424). If the example security obligation evaluator 1014 determines that a sufficient number, amount and/or percentage of the identified security obligations are satisfied (e.g., sufficient to result in and/or determine a conformance metric value indicating that the example container image 110 conforms to the example assessment policy 120), the example program 1400 proceeds to block 1426 described below. If the example security obligation evaluator 1014 determines that an insufficient number, amount and/or percentage of the identified security obligations are satisfied, the example program 1400 proceeds to block 1428 described below.

After the example container 310 has been assembled and a sufficient number, amount and/or percentage of the identified security obligations have been satisfied, the example execution indicator 1016 of FIG. 10 generates and/or provides an indication to execute the example container 310 associated with the example container image 110 in the example host environment 150 (block 1426).

If, at block 1424, the example security obligation evaluator 1014 determined that an insufficient number, amount and/or percentage of the identified security obligations are satisfied in the example host environment 150, the example execution indicator 1016 of FIG. 10 generates and/or provides an indication to block the execution of an example container 310 associated with the example container image 110 in the example host environment 150 (block 1428). At block 1428, the example execution indicator 1016 also generates and/or provides an indication to block the execution of an example container 310 associated with the example container image 110 in the example host environment 150 in instances where, at block 1416, the example security assertion evaluator 1012 determined that the remaining security assertion documents, in combination with the retested security assertions from block 1414, do not satisfy the identified assessment policies.

The example program of FIGS. 14A and 14B ends after the example execution indicator 1016 has provided an indication as described above in connection with either of block 1426 or block 1428.

Figure 15:
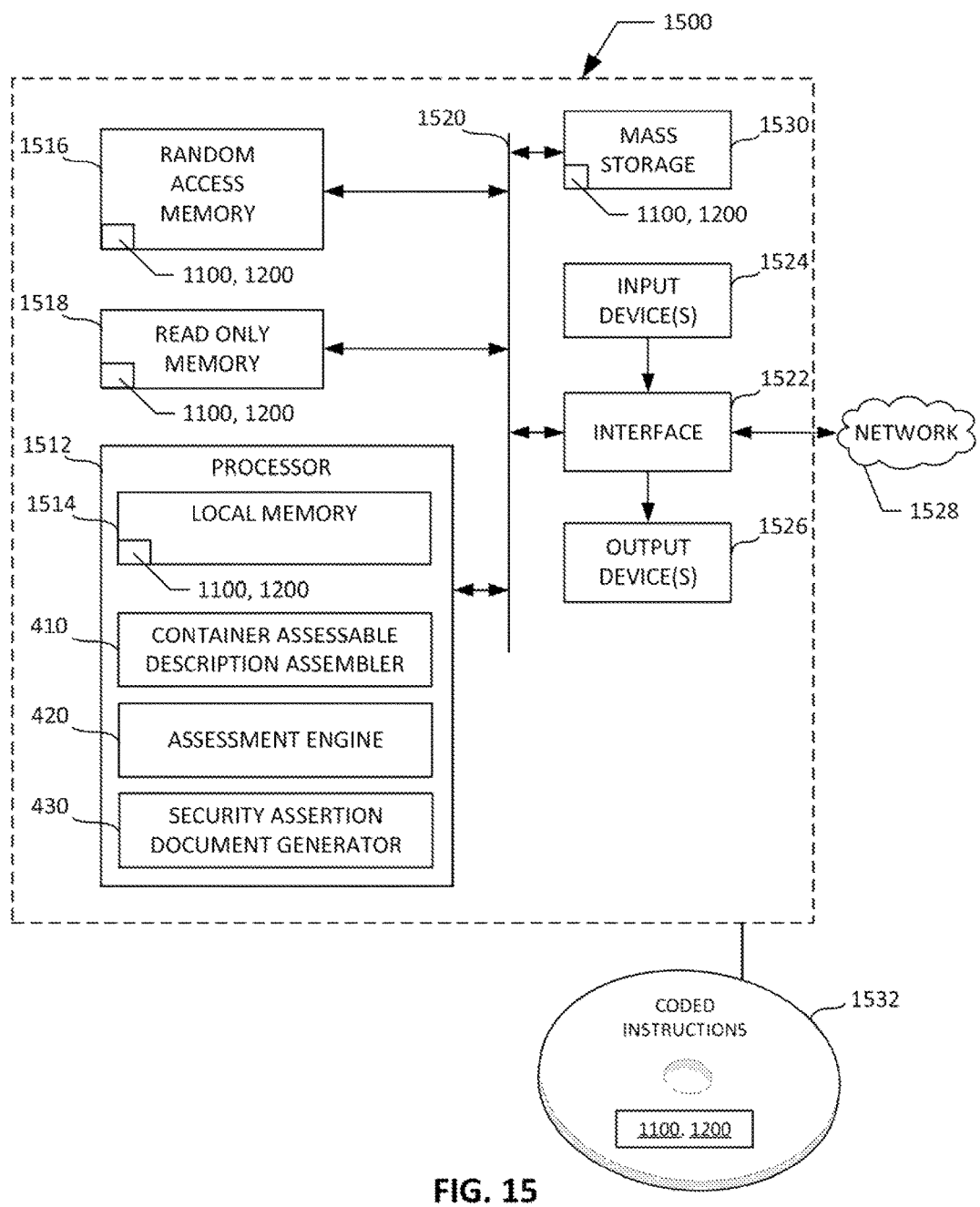
FIG. 15 is a block diagram of an example processing platform capable of executing the example instructions of FIGS. 11 and/or 12 to implement the example security assessment system of FIGS. 1 and 4.

FIG. 15 is a block diagram of an example processor platform 1500 capable of executing the instructions of FIGS. 11 and/or 12 to implement the example security assessment system 130 of FIGS. 1 and 4. The processor platform 1500 can be, for example, a server, a personal computer, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer.

The processor 1512 of the illustrated example includes the example container assessable description assembler 410, the example assessment engine 420 and the example security assertion document generator 430 described above in connection with FIG. 4. The example processor 1512 also includes a local memory 1514 (e.g., a cache). The processor 1512 of the illustrated example is in communication with a main memory including a volatile memory 1516 and a non-volatile memory 1518 via a bus 1520. The volatile memory 1516 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1518 may be implemented by flash memory and/or any other desired type of memory device. Access to the main memory 1516, 1518 is controlled by a memory controller.

The processor platform 1500 of the illustrated example also includes an interface circuit 1522. The interface circuit 1522 may be implemented by any type of interface standard, such as an Ethernet interface, a universal serial bus (USB), and/or a PCI express interface.

In the illustrated example, one or more input devices 1524 are connected to the interface circuit 1522. The input device(s) 1524 permit(s) a user to enter data and commands into the processor 1512. The input device(s) can be implemented by, for example, a keyboard, a mouse, a touchscreen, a track-pad, a trackball, isopoint and/or a voice recognition system.

One or more output devices 1526 are also connected to the interface circuit 1522 of the illustrated example. The output devices 1526 can be implemented, for example, by display devices (e.g., a liquid crystal display, a cathode ray tube display (CRT), a touchscreen, a printer and/or speakers). The interface circuit 1522 of the illustrated example, thus, typically includes a graphics driver card, a graphics driver chip or a graphics driver processor.

The interface circuit 1522 of the illustrated example also includes a communication device such as a transmitter, a receiver, a transceiver, a modem and/or network interface card to facilitate exchange of data with external machines (e.g., computing devices of any kind) via a network 1528 (e.g., an Ethernet connection, a digital subscriber line (DSL), a telephone line, coaxial cable, a cellular telephone system, etc.).

The processor platform 1500 of the illustrated example also includes one or more mass storage devices 1530 for storing software and/or data. Examples of such mass storage devices 1530 include floppy disk drives, hard drive disks, compact disk drives, Blu-ray disk drives, RAID systems, and digital versatile disk (DVD) drives.

The coded instructions 1100 of FIG. 11 and/or the coded instructions 1200 of FIG. 12 may be stored in the mass storage device 1530, in the volatile memory 1516, in the non-volatile memory 1518, and/or on a removable tangible computer readable storage medium 1532 such as a CD or DVD.

Figure 16:
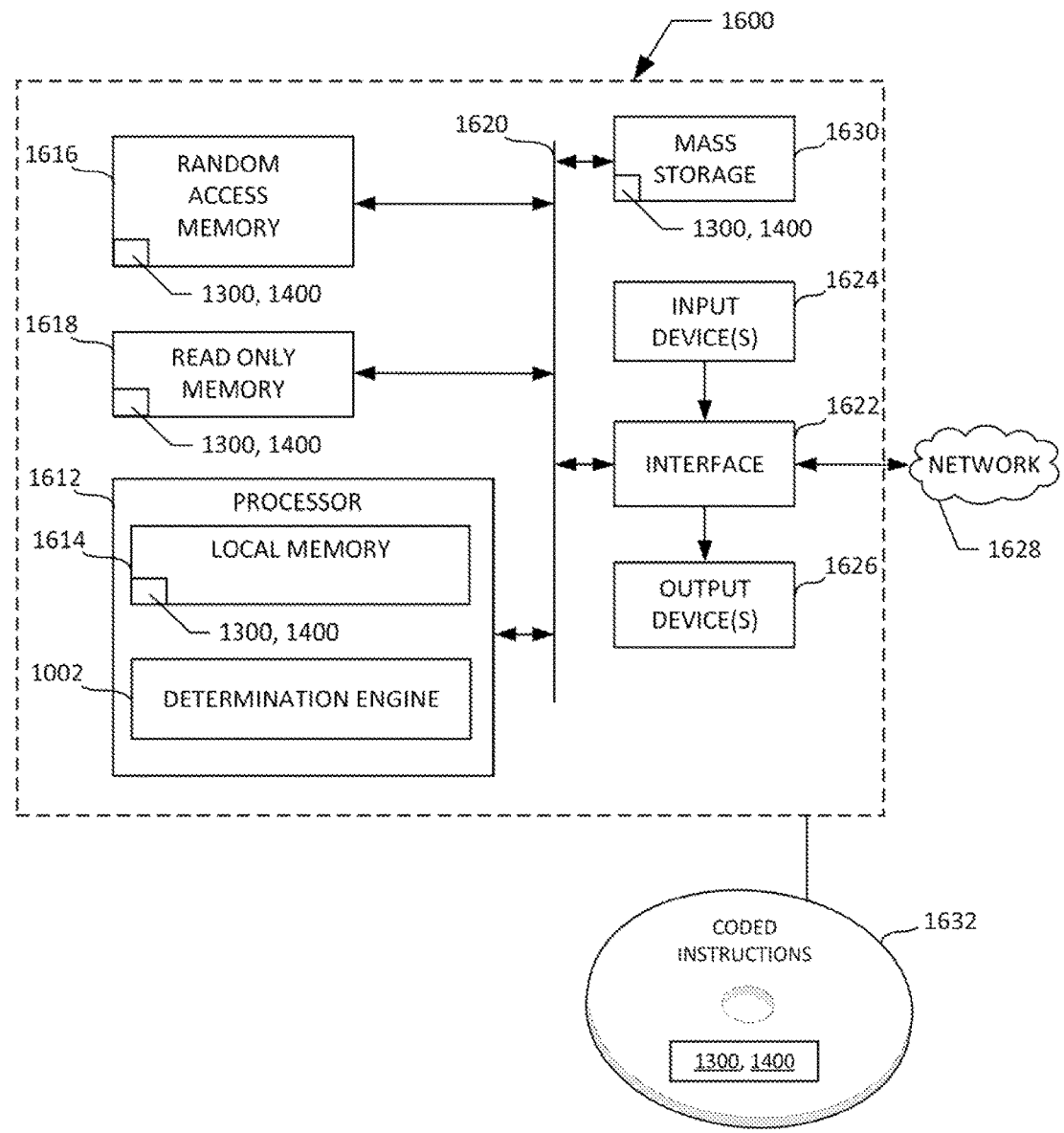
FIG. 16 is a block diagram of an example processing platform capable of executing the example instructions of FIGS. 13A-13B and/or 14A-14B to implement the example execution decision system of FIGS. 1 and 10.

FIG. 16 is a block diagram of an example processor platform 1600 capable of executing the instructions of FIGS. 13A-13B and/or 14A-14B to implement the example execution decision system 160 of FIGS. 1 and 10. The processor platform 1600 can be, for example, a server, a personal computer, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors or controllers from any desired family or manufacturer.

The processor 1612 of the illustrated example includes the example determination engine 1002 described above in connection with FIG. 10. The example processor 1612 also includes a local memory 1614 (e.g., a cache). The processor 1612 of the illustrated example is in communication with a main memory including a volatile memory 1616 and a non-volatile memory 1618 via a bus 1620. The volatile memory 1616 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1618 may be implemented by flash memory and/or any other desired type of memory device. Access to the main memory 1616, 1618 is controlled by a memory controller.

The processor platform 1600 of the illustrated example also includes an interface circuit 1622. The interface circuit 1622 may be implemented by any type of interface standard, such as an Ethernet interface, a universal serial bus (USB), and/or a PCI express interface.

In the illustrated example, one or more input devices 1624 are connected to the interface circuit 1622. The input device(s) 1624 permit(s) a user to enter data and commands into the processor 1612. The input device(s) can be implemented by, for example, a keyboard, a mouse, a touchscreen, a track-pad, a trackball, isopoint and/or a voice recognition system.

One or more output devices 1626 are also connected to the interface circuit 1622 of the illustrated example. The output devices 1626 can be implemented, for example, by display devices (e.g., a liquid crystal display, a cathode ray tube display (CRT), a touchscreen, a printer and/or speakers). The interface circuit 1622 of the illustrated example, thus, typically includes a graphics driver card, a graphics driver chip or a graphics driver processor.

The interface circuit 1622 of the illustrated example also includes a communication device such as a transmitter, a receiver, a transceiver, a modem and/or network interface card to facilitate exchange of data with external machines (e.g., computing devices of any kind) via a network 1628 (e.g., an Ethernet connection, a digital subscriber line (DSL), a telephone line, coaxial cable, a cellular telephone system, etc.).

The processor platform 1600 of the illustrated example also includes one or more mass storage devices 1630 for storing software and/or data. Examples of such mass storage devices 1630 include floppy disk drives, hard drive disks, compact disk drives, Blu-ray disk drives, RAID systems, and digital versatile disk (DVD) drives.

The coded instructions 1300 of FIGS. 13A-13B and/or the coded instructions 1400 of FIGS. 14A-14B may be stored in the mass storage device 1630, in the volatile memory 1616, in the non-volatile memory 1618, and/or on a removable tangible computer readable storage medium 1632 such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:

obtaining a container image from a repository by a processor of an assessor during an assessment phase;

assembling a container assessable description associated with the container image, the container assessable description specifying a plurality of unassembled parts to be assembled based on the container image to form a container to execute in a host environment, the unassembled parts including a property;

obtaining, by executing an instruction with the processor during the assessment phase, a rule from an assessment policy associated with the container image, the rule specifying an expected value of the property;

determining, by executing an instruction with the processor during the assessment phase, whether an assessed value of the property of one of the plurality of unassembled parts matches the expected value of the property;

in response to determining that the assessed value matches the expected value, generating, by executing an instruction with the processor during the assessment phase, a security assertion associated with the container image based on the property and based on the rule;

generating, by executing an instruction with the processor during the assessment phase, a security assertion document based on the container assessable description and based on the security assertion, the security assertion document including a container image reference indicative of the container image and an assessment policy reference indicative of the assessment policy; and providing the security assertion document for access by an execution decision system, the security assertion document to enable the execution decision system to determine whether the container image is to be assembled for execution in the host environment based on whether the security assertion document satisfies the assessment policy.

2. The method of claim 1, wherein the unassembled parts include at least one of a build file, a base image reference, a build argument, a layer file, a build environment value, a creation argument, a run argument, or a host environment value.

3. The method of claim 2, wherein the build file includes instructions that direct a construction of the container image, the build file having the property, and the rule specifying the expected value for the property.

4. The method of claim 1, wherein the unassembled parts include a pre-execution phase part and an execution phase part, the pre-execution phase part including a pre-execution phase property, and the execution phase part including an execution phase property.

5. The method of claim 4, wherein generating the security assertion associated with the container image is based on the pre-execution phase property.

6. The method of claim 5, further including generating a security obligation associated with the container image based on the execution phase property and based on the rule, and the generating of the security assertion document associated with the container image is further based on the security obligation.

7. The method of claim 1, wherein the security assertion document is separate from the container image, and generating the security assertion document does not alter the container image.

8. The method of claim 1, wherein the security assertion document further includes the container assessable description, the rule, and the security assertion.

9. The method of claim 1, wherein the security assertion document further includes information indicative of a level of conformance of the container image to the assessment policy.

10. The method of claim 1, wherein the container image reference of the security assertion document includes a cryptographic fingerprint indicative of the container image from which the security assertion document was generated.

11. The method of claim 1, wherein the security assertion document further includes a cryptographic signature indicative of an entity that generated the security assertion document.

12. An apparatus, comprising: a container assessable description assembler to:
obtain a container image from a repository during an assessment phase; and
assemble a container assessable description associated with the container image, the container assessable description specifying a plurality of unassembled parts to be assembled based on the container image to form a container to execute in a host environment, the unassembled parts including a property;
an assessment engine to:
obtain a rule from an assessment policy associated with the container image, the rule specifying an expected value of the property;
determine whether an assessed value of the property of one of the plurality of unassembled parts matches the expected value of the property;
generate a security assertion associated with the container image based on the property and based on the rule when the assessed value matches the expected value; and
a security assertion document generator to:
generate a security assertion document based on the container assessable description and based on the security assertion, the security assertion document including a container image reference indicative of the container image and an assessment policy reference indicative of the assessment policy; and
provide the security assertion document for access by an execution decision system, the security assertion document to enable the execution decision system to determine whether the container image is to be assembled for execution in the host environment based on whether the security assertion document satisfies the assessment policy.

13. The apparatus of claim 12, wherein the unassembled parts include at least one of a build file, a base image reference, a build argument, a layer file, a build environment value, a creation argument, a run argument, or a host environment value.

14. The apparatus of claim 13, wherein the build file includes instructions that direct a construction of the container image, the build file having the property, and the rule specifying the expected value for the property.

15. The apparatus of claim 12, wherein the unassembled parts include a pre-execution phase part and an execution phase part, the pre-execution phase part including a pre-execution phase property, and the execution phase part including an execution phase property.

16. The apparatus of claim 15, wherein the assessment engine generates the security assertion associated with the container image based on the pre-execution phase property.

17. The apparatus of claim 16, further including a security obligation generator to generate a security obligation associated with the container image based on the execution phase property and based on the rule, and the security assertion document generator to generate the security assertion document associated with the container image based on the security obligation.

18. The apparatus of claim 12, wherein the security assertion document is separate from the container image, and the security assertion document generator does not alter the container image.

19. The apparatus of claim 12, wherein the security assertion document further includes the container assessable description, the rule, and the security assertion.

20. The apparatus of claim 12, wherein the security assertion document further includes information indicative of a level of conformance of the container image to the assessment policy.

21. The apparatus of claim 12, wherein the container image reference of the security assertion document includes a cryptographic fingerprint indicative of the container image from which the security assertion document was generated.

22. The apparatus of claim 12, wherein the security assertion document further includes a cryptographic signature indicative of an entity that generated the security assertion document.

23. An article of manufacture comprising computer readable instructions which, when executed, cause a processor to at least:
obtain a container image from a repository during an assessment phase;
assemble a container assessable description associated with the container image, the container assessable description specifying a plurality of unassembled parts to be assembled based on the container image to form a container to execute in a host environment, the unassembled parts including a property;
obtain a rule from an assessment policy associated with the container image, the rule specifying an expected value of the property;
determine whether an assessed value of the property of one of the plurality of unassembled parts matches the expected value of the property;
generate a security assertion associated with the container image based on the property and based on the rule when the assessed value is determined to match the expected value; and
generate a security assertion document based on the container assessable description and based on the security assertion, the security assertion document including a container image reference indicative of the container image and an assessment policy reference indicative of the assessment policy; and
provide the security assertion document for access by an execution decision system, the security assertion document to enable the execution decision system to determine whether the container image is to be assembled for execution in the host environment based on whether the security assertion document satisfies the assessment policy.

24. The article of manufacture of claim 23, wherein the unassembled parts include at least one of a build file, a base image reference, a build argument, a layer file, a build environment value, a creation argument, a run argument, or a host environment value.

25. The article of manufacture of claim 24, wherein the build file includes second instructions that direct a construction of the container image, the build file having the property, and the rule specifying the expected value for the property.

26. The article of manufacture of claim 23, wherein the unassembled parts include a pre-execution phase part and an execution phase part, the pre-execution phase part including a pre-execution phase property, and the execution phase part including an execution phase property.

27. The article of manufacture of claim 26, wherein the instructions are to cause the processor to generate the security assertion associated with the container image based on the pre-execution phase property.

28. The article of manufacture of claim 27, wherein the instructions are further to cause the processor to at least:
generate a security obligation associated with the container image based on the execution phase property and based on the rule; and
generate the security assertion document associated with the container image based on the security obligation.

29. The article of manufacture of claim 23, wherein the security assertion document is separate from the container image, and the instructions are further to cause the processor to at least generate the security assertion document without altering the container image.

30. The article of manufacture of claim 23, wherein the security assertion document further includes the container assessable description, the rule, and the security assertion.

31. The article of manufacture of claim 23, wherein the security assertion document further includes information indicative of a level of conformance of the container image to the assessment policy.

32. The article of manufacture of claim 23, wherein the container image reference of the security assertion document includes a cryptographic fingerprint indicative of the container image from which the security assertion document was generated.

33. The article of manufacture of claim 23, wherein the security assertion document further includes a cryptographic signature indicative of an entity that generated the security assertion document.

34. A method, comprising:
obtaining a container image from a repository by a processor of a relying party during an execution phase;
obtaining, by executing an instruction with the processor during the execution phase, a security assertion document associated with the container image, the security assertion document having been generated at a first time, the security assertion document being separate from the container image, the container image unaltered by the generation of the security assertion document at the first time, and the security assertion document including:
a container image reference indicative of the container image from which the security assertion document was generated;
a container assessable description indicative of a plurality of unassembled parts, the unassembled parts to be assembled based on the container image to form a container for execution in a host environment, and the unassembled parts including a property;
an assessment policy reference indicative of an assessment policy, wherein the assessment policy includes a rule specifying an expected value of the property; and
a security assertion generated based on the property and based on the rule;
determining, by executing an instruction with the processor during the execution phase, whether an assessed value of the property of one of the plurality of unassembled parts matches the expected value of the property; and
in response to determining that the assessed value matches the expected value, executing the container in the host environment at a second time, wherein the second time is subsequent to the first time.

35. The method of claim 34, wherein determining whether to assemble the unassembled parts for execution in the host environment includes verifying the security assertion by testing the security assertion based on the property and based on the rule.

36. The method of claim 34, wherein the unassembled parts include at least one of a build file, a base image reference, a build argument, a layer file, a build environment value, a creation argument, a run argument, or a host environment value.

37. The method of claim 36, wherein the build file includes instructions that direct a construction of the container image, the build file having the property, and the rule specifying the expected value for the property.

38. The method of claim 34, wherein the unassembled parts include a pre-execution phase part and an execution phase part, the pre-execution phase part including a pre-execution phase property, and the execution phase part including an execution phase property.

39. The method of claim 38, wherein the security assertion is based on the pre-execution phase property.

40. The method of claim 39, wherein the security assertion document further includes a security obligation generated based on the execution phase property and based on the rule, and the method further including determining whether to assemble the unassembled parts for execution in the host environment by testing the security obligation.

41. The method of claim 34, wherein the security assertion document further includes information indicative of a level of conformance of the container image to the assessment policy.

42. The method of claim 34, wherein the container image reference of the security assertion document includes a cryptographic fingerprint indicative of the container image from which the security assertion document was generated.

43. The method of claim 34, wherein the security assertion document further includes a cryptographic signature indicative of an entity that generated the security assertion document, and further including determining whether to assemble the unassembled parts for execution in the host environment based on whether the entity is a trusted entity.

44. An apparatus, comprising:
a determination engine to:
obtain a container image from a repository during an execution phase;
obtain, during the execution phase, a security assertion document associated with the container image, the security assertion document having been generated at a first time, the security assertion document being separate from the container image, the container image unaltered by the generation of the security assertion document at the first time, and the security assertion document including:
  a container image reference indicative of the container image from which the security assertion document was generated;
  a container assessable description indicative of a plurality of unassembled parts, the unassembled parts to be assembled based on the container image to form a container for execution in a host environment, and the unassembled parts including a property;
  an assessment policy reference indicative of an assessment policy, wherein the assessment policy includes a rule specifying an expected value of the property; and
  a security assertion generated based on the property and based on the rule;
determine, during the execution phase, whether an assessed value of the property of one of the plurality of unassembled parts matches the expected value of the property; and
a processor to execute the container in the host environment at a second time when the assessed value matches the expected value, wherein the second time is subsequent to the first time.

45. The apparatus of claim 44, wherein the determination engine is to determine whether to assemble the unassembled parts for execution in the host environment by verifying the security assertion by testing the security assertion based on the property and based on the rule.

46. The apparatus of claim 44, wherein the unassembled parts include at least one of a build file, a base image reference, a build argument, a layer file, a build environment value, a creation argument, a run argument, or a host environment value.

47. The apparatus of claim 46, wherein the build file includes instructions that direct a construction of the container image, the build file having the property, and the rule specifying the expected value for the property.

48. The apparatus of claim 44, wherein the unassembled parts include a pre-execution phase part and an execution phase part, the pre-execution phase part including a pre-execution phase property, and the execution phase part including an execution phase property.

49. The apparatus of claim 48, wherein the security assertion is based on the pre-execution phase property.

50. The apparatus of claim 49, wherein the security assertion document further includes a security obligation generated based on the execution phase property and based on the rule, and the determination engine is to determine whether to assemble the unassembled parts for execution in the host environment by testing the security obligation.

51. The apparatus of claim 44, wherein the security assertion document further includes information indicative of a level of conformance of the container image to the assessment policy.

52. The apparatus of claim 44, wherein the container image reference of the security assertion document includes a cryptographic fingerprint indicative of the container image from which the security assertion document was generated.

53. The apparatus of claim 44, wherein the security assertion document further includes a cryptographic signature indicative of an entity that generated the security assertion document, and the determination engine is to determine whether to assemble the unassembled parts for execution in the host environment by determining whether the entity is a trusted entity.

54. An article of manufacture comprising computer readable instructions which, when executed, cause at least one processor to at least:
  obtain a container image from a repository during an execution phase;
  obtain, during the execution phase, a security assertion document associated with the container image, the security assertion document having been generated at a first time, the security assertion document being separate from the container image, the container image unaltered by the generation of the security assertion document at the first time, and the security assertion document including:
    a container image reference indicative of the container image from which the security assertion document was generated;
    a container assessable description indicative of a plurality of unassembled parts, the unassembled parts to be assembled based on the container image to form a container for execution in a host environment, and the unassembled parts including a property;
    an assessment policy reference indicative of an assessment policy, wherein the assessment policy includes a rule specifying an expected value of the property; and
    a security assertion generated based on the property and based on the rule;
  determine, during the execution phase, whether an assessed value of the property of one of the plurality of unassembled parts matches the expected value of the property; and
    execute the container in the host environment at a second time when the assessed value matches the expected value, wherein the second time is subsequent to the first time.

55. The article of manufacture of claim 54, wherein the instructions further cause the at least one processor to at least determine whether to assemble the unassembled parts for execution in the host environment by verifying the security assertion by testing the security assertion based on the property and based on the rule.

56. The article of manufacture of claim 54, wherein the unassembled parts include at least one of a build file, a base image reference, a build argument, a layer file, a build environment value, a creation argument, a run argument, or a host environment value.

57. The article of manufacture of claim 56, wherein the build file includes second instructions that direct a construction of the container image, the build file having the property, and the rule specifying the expected value for the property.

58. The article of manufacture of claim 54, wherein the unassembled parts include a pre-execution phase part and an execution phase part, the pre-execution phase part including a pre-execution phase property, and the execution phase part including an execution phase property.

59. The article of manufacture of claim 58, wherein the security assertion is based on the pre-execution phase property.

60. The article of manufacture of claim 59, wherein the security assertion document further includes a security obligation generated based on the execution phase property and based on the rule, and the instructions to further cause the at least one processor to at least determine whether to assemble the unassembled parts for execution in the host environment by testing the security obligation.

61. The article of manufacture of claim 54, wherein the security assertion document further includes information indicative of a level of conformance of the container image to the assessment policy.

62. The article of manufacture of claim 54, wherein the container image reference of the security assertion document includes a cryptographic fingerprint indicative of the container image from which the security assertion document was generated.

63. The article of manufacture of claim 54, wherein the security assertion document further includes a cryptographic signature indicative of an entity that generated the security assertion document, and the instructions to further cause the at least one processor to at least determine whether to assemble the unassembled parts for execution in the host environment by determining whether the entity is a trusted entity.

* * * * *